US012718796B2

(12) United States Patent
Choi

(10) Patent No.: US 12,718,796 B2
(45) Date of Patent: Aug. 25, 2026

(54) ELECTRONIC DEVICE SPEECH RECOGNITION METHOD THEREOF

(71) Applicant: SAMSUNG ELECTRONICS CO., LTD., Suwon-si (KR)

(72) Inventor: Chanhee Choi, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 240 days.

(21) Appl. No.: 18/543,808

(22) Filed: Dec. 18, 2023

(65) Prior Publication Data

US 2024/0127793 A1 Apr. 18, 2024

Related U.S. Application Data

(63) Continuation of application No. PCT/KR2023/010950, filed on Jul. 27, 2023.

(30) Foreign Application Priority Data

Aug. 5, 2022 (KR) ........................ 10-2022-0097787
Sep. 7, 2022 (KR) ........................ 10-2022-0113385

(51) Int. Cl.
*G10L 15/01* (2013.01)
*G10L 15/22* (2006.01)

(52) U.S. Cl.
CPC .............. *G10L 15/01* (2013.01); *G10L 15/22* (2013.01); *G10L 2015/223* (2013.01)

(58) Field of Classification Search
CPC ... G10L 15/01; G10L 15/22; G10L 2015/223; G10L 15/26; G10L 25/87; G06F 3/16
See application file for complete search history.

(56) References Cited

U.S. PATENT DOCUMENTS

2008/0082329 A1* 4/2008 Watson .................. G10L 15/32 704/235
2016/0253989 A1* 9/2016 Kuo ..................... G10L 15/183 704/257
2021/0201895 A1 7/2021 Yu et al.
2021/0272564 A1 9/2021 Kamada
2021/0312930 A1* 10/2021 Sugaya .................. G10L 15/22

FOREIGN PATENT DOCUMENTS

KR 10-0919225 B1 9/2009
KR 10-1726945 B1 4/2017
KR 10-1741734 B1 6/2017
KR 10-2019-0094316 A 8/2019
KR 10-2019-0096856 A 8/2019
KR 10-2020-0105259 A 9/2020
KR 10-2021-0084207 A 7/2021
KR 10-2022-0035222 A 3/2022

* cited by examiner

*Primary Examiner* — Abul K Azad
(74) *Attorney, Agent, or Firm* — Sughrue Mion, PLLC

(57) ABSTRACT

An electronic device includes: a memory storing instructions; and a processor operatively connected to the memory and configured to execute the instructions to: perform a first analysis operation of confirming a recognition error for a voice based on an input time of the voice; determine whether to perform a second analysis operation of confirming the recognition error in response to a result of the first analysis operation; based on a determination to perform the second analysis operation, perform the second analysis operation based on a text corresponding to the voice; and provide a recognition result of the voice based on a result of the second analysis operation.

18 Claims, 14 Drawing Sheets

600

600

1300

The error may occur due to ambient noise.
Please try again in a quiet environment.

ELECTRONIC DEVICE SPEECH RECOGNITION METHOD THEREOF

CROSS-REFERENCE TO RELATED APPLICATIONS

This application is a continuation application of International Application No. PCT/KR2023/010950 designating the United States, filed on Jul. 27, 2023, in the Korean Intellectual Property Receiving Office, which claims priority to Korean Patent Application No. 10-2022-0097787, filed on Aug. 5, 2022 and Korean Patent Application No. 10-2022-0113385, filed on Sep. 7, 2022, in the Korean Intellectual Property Office, the disclosures of which are incorporated by reference herein in their entireties.

BACKGROUND

1. Field

The disclosure relates to an electronic device and a speech recognition method thereof.

2. Description of Related Art

Various services using a speech recognition technology for recognizing a user's voice and providing a response thereto are provided.

An electronic device may activate a speech recognition service in response to a user's voice (e.g., utterance of a wake-up word) or a user's button manipulation (e.g., voice input button manipulation). The electronic device may process passive errors by performing a meaningless search or outputting instructions for an unintended voice input, such as in correct recognition of a wake-up word or improper manipulation of a voice input button.

It may be necessary to improve accuracy of the speech recognition in order to perform an operation intended by a user.

SUMMARY

According to an embodiment of the disclosure, in order to improve the accuracy of the speech recognition, a technology for identifying an end of speech (e.g., a speech signal-based end point detector (EPD) or a contextual end point detector) may be used. In addition, according to an embodiment of the disclosure, a technology for limiting the time for a voice input and terminating the voice input when the time limit is exceeded regardless of the detection of the end point of the speech may be used.

According to an aspect of the disclosure, an electronic device includes: a memory storing instructions; and a processor operatively connected to the memory and configured to execute the instructions to: perform a first analysis operation of confirming a recognition error for a voice based on an input time of the voice; determine whether to perform a second analysis operation of confirming the recognition error in response to a result of the first analysis operation; based on a determination to perform the second analysis operation, perform the second analysis operation based on a text corresponding to the voice; and provide a recognition result of the voice based on a result of the second analysis operation.

According to another aspect of the disclosure, a method performed by an electronic device, which includes: performing a first analysis operation of confirming a recognition error for a voice based on an input time of the voice; determining whether to perform a second analysis operation of confirming the recognition error in response to a result of the first analysis operation; performing the second analysis operation based on a text corresponding to the voice, based on determining to perform the second analysis operation; and providing a recognition result of the voice based on a result of the second analysis operation.

BRIEF DESCRIPTION OF THE DRAWINGS

The above and other aspects, features, and advantages of certain embodiments of the present disclosure will be more apparent from the following detailed description, taken in conjunction with the accompanying drawings, in which.

DETAILED DESCRIPTION

Figure 1:
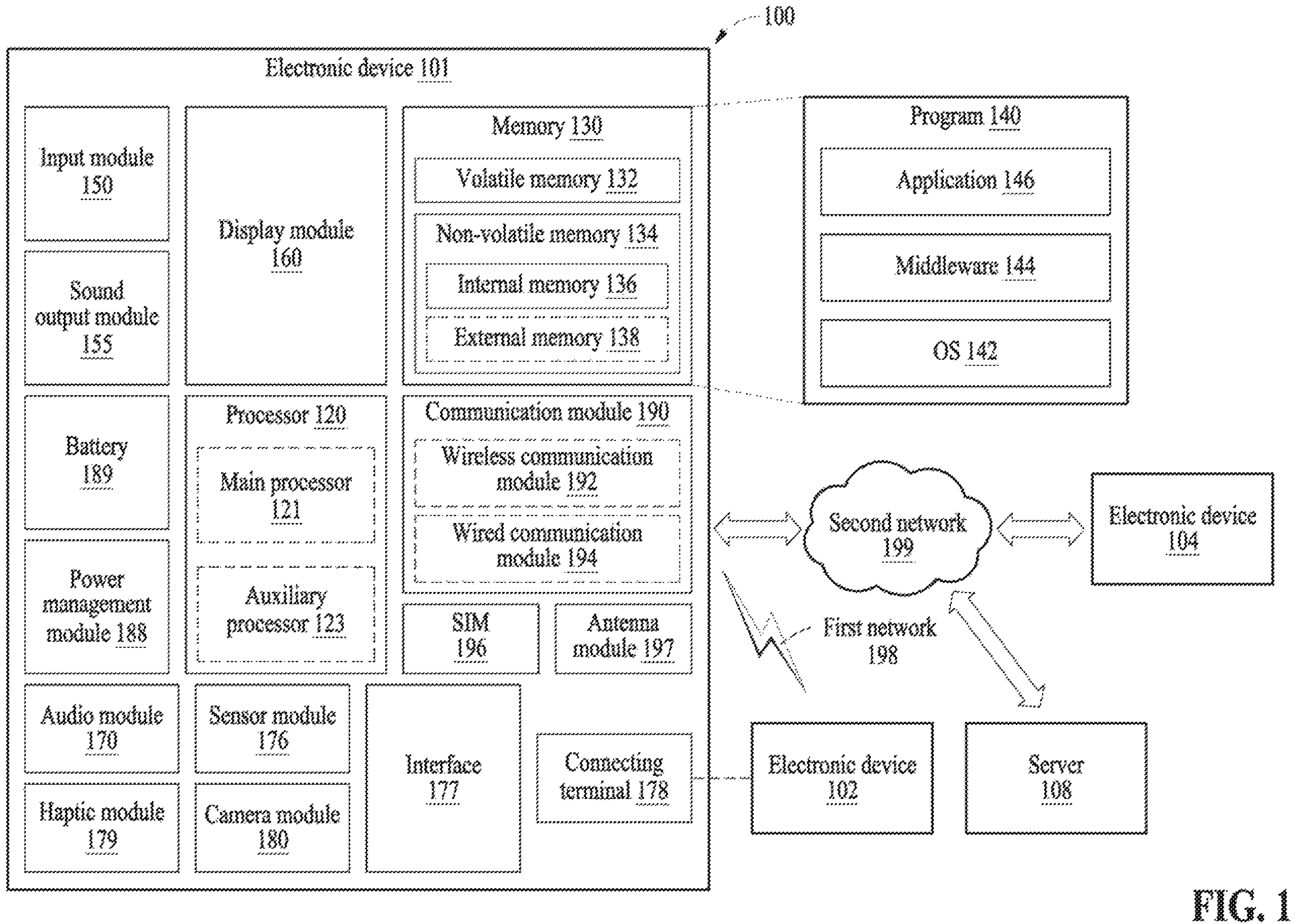
FIG. 1 is a block diagram illustrating an electronic device in a network environment according to an embodiment.

Hereinafter, embodiments will be described in detail with reference to the accompanying drawings. When describing the embodiments with reference to the accompanying drawings, like reference numerals refer to like elements and a repeated description related thereto will be omitted.

FIG. 1 is a block diagram illustrating an electronic device 101 in a network environment 100 according to an embodiment. Referring to FIG. 1, the electronic device 101 in the network environment 100 may communicate with an electronic device 102 via a first network 198 (e.g., a short-range wireless communication network), or communicate with at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, a memory 130, an input module 150, a sound output module 155, a display module 160, an audio module 170, and a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one of the components (e.g., the connecting terminal 178) may be omitted from the electronic device 101, or one or more other components may be added in the electronic device 101. In some embodiments, some of the components (e.g., the sensor module 176, the camera module 180, or the antenna module 197) may be integrated as a single component (e.g., the display module 160).

The processor 120 may execute, for example, software (e.g., a program 140) to control at least one other component (e.g., a hardware or software component) of the electronic device 101 connected to the processor 120, and may perform various data processing or computation. According to an embodiment, as at least a part of data processing or computation, the processor 120 may store a command or data received from another component (e.g., the sensor module 176 or the communication module 190) in a volatile memory 132, process the command or the data stored in the volatile memory 132, and store resulting data in a non-volatile memory 134. According to an embodiment, the processor 120 may include a main processor 121 (e.g., a central processing unit (CPU) or an application processor (AP)) or an auxiliary processor 123 (e.g., a graphics processing unit (GPU), a neural processing unit (NPU), an image signal processor (ISP), a sensor hub processor, or a communication processor (CP)) that is operable independently of, or in conjunction with the main processor 121. For example, when the electronic device 101 includes the main processor 121 and the auxiliary processor 123, the auxiliary processor 123 may be adapted to consume less power than the main processor 121 or to be specific to a specified function. The auxiliary processor 123 may be implemented separately from the main processor 121 or as a part of the main processor 121.

The auxiliary processor 123 may control at least some of functions or states related to at least one (e.g., the display module 160, the sensor module 176, or the communication module 190) of the components of the electronic device 101, instead of the main processor 121 while the main processor 121 is in an inactive (e.g., sleep) state or along with the main processor 121 while the main processor 121 is an active state (e.g., executing an application). According to an embodiment, the auxiliary processor 123 (e.g., an ISP or a CP) may be implemented as a portion of another component (e.g., the camera module 180 or the communication module 190) that is functionally related to the auxiliary processor 123. According to an embodiment, the auxiliary processor 123 (e.g., an NPU) may include a hardware structure specified for artificial intelligence model processing. An artificial intelligence model may be generated by machine learning. Such learning may be performed by, for example, the electronic device 101 in which artificial intelligence is performed, or performed via a separate server (e.g., the server 108). Learning algorithms may include, but are not limited to, for example, supervised learning, unsupervised learning, semi-supervised learning, or reinforcement learning. The AI model may include a plurality of artificial neural network layers. An artificial neural network may include, for example, a deep neural network (DNN), a convolutional neural network (CNN), a recurrent neural network (RNN), a restricted Boltzmann machine (RBM), a deep belief network (DBN), and a bidirectional recurrent deep neural network (BRDNN), a deep Q-network, or a combination of two or more thereof, but is not limited thereto. The AI model may additionally or alternatively include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored as software in the memory 130, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output a sound signal to the outside of the electronic device 101. The sound output module 155 may include, for example, a speaker or a receiver. The speaker may be used for general purposes, such as playing multimedia or playing record. The receiver may be used to receive an incoming call. According to an embodiment, the receiver may be implemented separately from the speaker or as a part of the speaker.

The display module 160 may visually provide information to the outside (e.g., a user) of the electronic device 101. The display module 160 may include, for example, a display, a hologram device, or a projector and control circuitry to control a corresponding one of the display, the hologram device, and the projector. According to an embodiment, the display module 160 may include a touch sensor adapted to sense a touch, or a pressure sensor adapted to measure an intensity of a force incurred by the touch.

The audio module 170 may convert a sound into an electric signal or vice versa. According to an embodiment, the audio module 170 may obtain the sound via the input module 150 or output the sound via the sound output module 155 or an external electronic device (e.g., an electronic device 102 such as a speaker or a headphone) directly or wirelessly connected to the electronic device 101.

The sensor module 176 may detect an operational state (e.g., power or temperature) of the electronic device 101 or an environmental state (e.g., a state of a user) external to the electronic device 101, and generate an electric signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., by wire) or wirelessly. According to an embodiment, the interface 177 may include, for example, a high-definition multimedia interface (HDMI), a universal serial bus (USB) interface, a secure digital (SD) card interface, or an audio interface.

The connecting terminal 178 may include a connector via which the electronic device 101 may be physically connected to an external electronic device (e.g., the electronic device 102). According to an embodiment, the connecting terminal 178 may include, for example, an HDMI connector, a USB connector, an SD card connector, or an audio connector (e.g., a headphone connector).

The haptic module 179 may convert an electric signal into a mechanical stimulus (e.g., a vibration or a movement) or an electrical stimulus which may be recognized by a user via his or her tactile sensation or kinesthetic sensation. According to an embodiment, the haptic module 179 may include, for example, a motor, a piezoelectric element, or an electric stimulator.

The camera module 180 may capture a still image and moving images. According to an embodiment, the camera module 180 may include one or more lenses, image sensors, ISPs, or flashes.

The power management module 188 may manage power supplied to the electronic device 101. According to an embodiment, the power management module 188 may be implemented as, for example, at least a part of a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently of the processor 120 (e.g., an AP) and that support a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module, or a power line communication (PLC) module). A corresponding one of these communication modules may communicate with the external electronic device 104 via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., a LAN or a wide area network (WAN))). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the SIM 196.

The wireless communication module 192 may support a 5G network after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., an mmWave band) to achieve, e.g., a high data transmission rate. The wireless communication module 192 may support various technologies for securing performance on a high-frequency band, such as, e.g., beamforming, massive multiple-input and multiple-output (MIMO), full dimensional MIMO (FD-MIMO), an array antenna, analog beam-forming, or a large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gaps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element including a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in a communication network, such as the first network 198 or the second network 199, may be selected by, for example, the communication module 190 from the plurality of antennas. The signal or the power may be transmitted or received between the communication module 190 and the external electronic device via the at least one selected antenna. According to an embodiment, another component (e.g., a radio frequency integrated circuit (RFIC)) other than the radiating element may be additionally formed as a part of the antenna module 197.

According to an embodiment, the antenna module 197 may form an mmWave antenna module. According to an embodiment, the mmWave antenna module may include a PCB, an RFIC disposed on a first surface (e.g., a bottom surface) of the PCB or adjacent to the first surface and capable of supporting a designated a high-frequency band (e.g., the mmWave band), and a plurality of antennas (e.g., array antennas) disposed on a second surface (e.g., a top or a side surface) of the PCB, or adjacent to the second surface and capable of transmitting or receiving signals in the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the external electronic devices 102 or 104 may be a device of the same type as or a different type from the electronic device 101. According to an embodiment, all or some of operations to be executed by the electronic device 101 may be executed at one or more external electronic devices (e.g., the external devices 102 and 104, and the server 108). For example, if the electronic device 101 needs to perform a function or a service automatically, or in response to a request from a user or another device, the electronic device 101, instead of, or in addition to, executing the function or the service, may request one or more external electronic devices to perform at least part of the function or the service. The one or more external electronic devices receiving the request may perform the at least part of the function or the service requested, or an additional function or an additional service related to the request, and may transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra-low-latency services using, e.g., distributed computing or mobile edge computing. In an embodiment, the external electronic device 104 may include an Internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or health-care) based on 5G communication technology or IoT-related technology.

Figure 2:
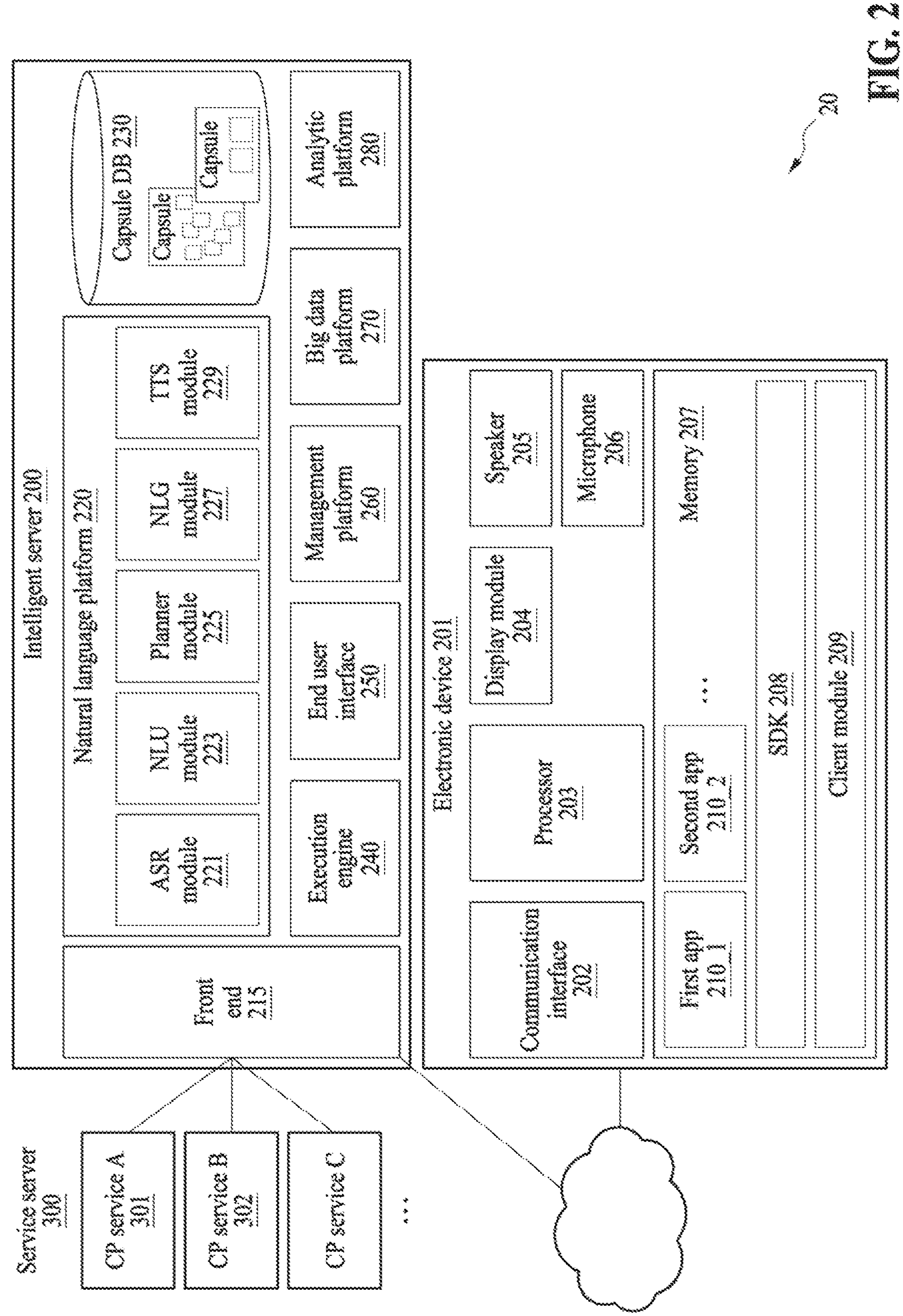
FIG. 2 is a block diagram illustrating an integrated intelligence system according to an embodiment.

FIG. 2 is a block diagram illustrating an integrated intelligence system according to an embodiment.

Referring to FIG. 2, an integrated intelligence system 20 according to an embodiment may include an electronic device 201 (e.g., the electronic device 101 of FIG. 1), an intelligent server 200 (e.g., the server 108 of FIG. 1), and a service server 300 (e.g., the server 108 of FIG. 1).

The electronic device 201 may be a terminal device (or an electronic device) connectable to the Internet, and may be, for example, a mobile phone, a smartphone, a personal digital assistant (PDA), a notebook computer, a TV, a white home appliance, a wearable device, a head-mounted display (HMD), or a smart speaker.

According to the shown embodiment, the electronic device 201 may include a communication interface 202 (e.g., the interface 177 of FIG. 1), a microphone 206 (e.g., the input module 150 of FIG. 1), a speaker 205 (e.g., the sound output module 155 of FIG. 1), a display module 204 (e.g., the display module 160 of FIG. 1), a memory 207 (e.g., the memory 130 of FIG. 1), or a processor 203 (e.g., the processor 120 of FIG. 1). The components listed above may be operationally or electrically connected to each other.

The communication interface 202 may be connected to an external device and configured to transmit and receive data to and from the external device. The microphone 206 may receive a sound (e.g., a user utterance) and convert the sound into an electrical signal. The speaker 205 may output the electrical signal as a sound (e.g., a speech).

The display module 204 may be configured to display an image or video. The display module 204 may also display a graphical user interface (GUI) of an app (or an application program) being executed. The display module 204 may receive a touch input through a touch sensor. For example, the display module 204 may receive a text input through a touch sensor in an on-screen keyboard area displayed in the display module 204.

The memory 207 may store a client module 209, a software development kit (SDK) 208, and a plurality of apps 210. The client module 209 and the SDK 208 may configure a framework (or a solution program) for performing general-purpose functions. In addition, the client module 209 or the SDK 208 may configure a framework for processing a user input (e.g., a voice input, a text input, or a touch input).

The plurality of apps 210 stored in the memory 207 may be programs for performing designated functions. According to an embodiment, the plurality of apps 210 may include a first app 210_1, a second app 210_2, and the like. According to an embodiment, each of the plurality of apps 210 may include a plurality of actions for performing a designated function. For example, the apps may include an alarm app, a messaging app, and/or a scheduling app. According to an embodiment, the plurality of apps 210 may be executed by the processor 203 to sequentially execute at least a portion of the plurality of actions.

The processor 203 may control the overall operation of the electronic device 201. For example, the processor 203 may be electrically connected or operatively connected to the communication interface 202, the microphone 206, the speaker 205, and the display module 204 to perform a designated operation.

The processor 203 may also perform the designated function by executing the program stored in the memory 207. For example, the processor 203 may execute at least one of the client module 209 or the SDK 208 to perform the following operation for processing a user input. The processor 203 may control the operation of the plurality of apps 210 through, for example, the SDK 208. The following operation which is the operation of the client module 209 or the SDK 208 may be performed by the processor 203.

The client module 209 may receive a user input. For example, the client module 209 may receive a voice signal corresponding to a user utterance sensed through the microphone 206. As another example, the client module 209 may receive a touch input sensed through the display module 204. As still another example, the client module 209 may receive a text input sensed through a keyboard or an on-screen keyboard. In addition, the client module 209 may receive various types of user inputs sensed through an input module included in the electronic device 201 or an input module connected to the electronic device 201. The client module 209 may transmit the received user input to the intelligent server 200. The client module 209 may transmit state information of the electronic device 201 together with the received user input to the intelligent server 200. The state information may be, for example, execution state information of an app.

The client module 209 may receive a result corresponding to the received user input. For example, when the intelligent server 200 is capable of obtaining a result corresponding to the received user input, the client module 209 may receive the result corresponding to the received user input. The client module 209 may display the received result on the display module 204. Further, the client module 209 may output the received result in an audio form through the speaker 205.

The client module 209 may receive a plan corresponding to the received user input. The client module 209 may display results of executing a plurality of actions of an app according to the plan on the display module 204. For example, the client module 209 may sequentially display the results of executing the plurality of actions on the display module 204 and output the results in an audio form through the speaker 205. As another example, the electronic device

201 may display only a portion of the results of executing the plurality of actions (e.g., a result of the last action) on the display module 204 and output the portion of the results in an audio form through the speaker 205.

According to an embodiment, the client module 209 may receive a request for obtaining information necessary for obtaining a result corresponding to the user input from the intelligent server 200. According to an embodiment, the client module 209 may transmit the necessary information to the intelligent server 200 in response to the request.

The client module 209 may transmit information on the results of executing the plurality of actions according to the plan to the intelligent server 200. The intelligent server 200 may confirm that the received user input has been correctly processed using the information on the results.

The client module 209 may include a speech recognition module. According to an embodiment, the client module 209 may recognize a voice input for performing a limited function through the speech recognition module. For example, the client module 209 may execute an intelligent app for processing a voice input to perform an organic operation through a designated input (e.g., Wake up!).

The intelligent server 200 may receive information related to a user voice input from the electronic device 201 through a communication network. According to an embodiment, the intelligent server 200 may change data related to the received voice input into text data. According to an embodiment, the intelligent server 200 may generate a plan for performing a task corresponding to the user voice input based on the text data.

According to an embodiment, the plan may be generated by an artificial intelligence (AI) system. The artificial intelligence system may be a rule-based system or a neural network-based system (e.g., a feedforward neural network (FNN) or a recurrent neural network (RNN)). Alternatively, the artificial intelligence system may be a combination thereof or other artificial intelligence systems. According to an embodiment, the plan may be selected from a set of predefined plans or may be generated in real time in response to a user request. For example, the AI system may select at least one plan from among the predefined plans.

The intelligent server 200 may transmit a result according to the generated plan to the electronic device 201 or transmit the generated plan to the electronic device 201. According to an embodiment, the electronic device 201 may display the result according to the plan on the display module 204. According to an embodiment, the electronic device 201 may display a result of executing an action according to the plan on the display module 204.

The intelligent server 200 may include a front end 215, a natural language platform 220, a capsule database (DB) 230, an execution engine 240, an end user interface 250, a management platform 260, a big data platform 270, or an analytic platform 280.

The front end 215 may receive the received user input from the electronic device 201. The front end 215 may transmit a response corresponding to the user input.

According to an embodiment, the natural language platform 220 may include an automatic speech recognition (ASR) module 221, a natural language understanding (NLU) module 223, a planner module 225, a natural language generator (NLG) module 227, or a text-to-speech (TTS) module 229.

The ASR module 221 may convert the voice input received from the electronic device 201 into text data. The NLU module 223 may discern an intent of a user using the text data of the voice input. For example, the NLU module 223 may discern the intent of the user by performing syntactic analysis or semantic analysis on a user input in the form of text data. The NLU module 223 may discern the meaning of a word extracted from the user input using a linguistic feature (e.g., a grammatical element) of a morpheme or phrase, and determine the intent of the user by matching the discerned meaning of the word to an intent. The NLU module 223 may obtain intent information corresponding to the user utterance. The intent information may be information indicating an intent of the user determined through an analysis of the text data. The intent information may include information indicating an action or function that the user intends to execute using a device.

The planner module 225 may generate a plan using a parameter and the intent determined by the NLU module 223. According to an embodiment, the planner module 225 may determine a plurality of domains required to perform a task based on the determined intent. The planner module 225 may determine a plurality of actions included in each of the plurality of domains determined based on the intent. According to an embodiment, the planner module 225 may determine a parameter required to execute the determined plurality of actions or a result value output by the execution of the plurality of actions. The parameter and the result value may be defined as a concept of a designated form (or class). Accordingly, the plan may include a plurality of actions and a plurality of concepts determined by the user intent. The planner module 225 may determine a relationship between the plurality of actions and the plurality of concepts stepwise (or hierarchically). For example, the planner module 225 may determine an execution order of the plurality of actions determined based on the user intent, based on the plurality of concepts. In other words, the planner module 225 may determine the execution order of the plurality of actions based on the parameter required for the execution of the plurality of actions and results output by the execution of the plurality of actions. Accordingly, the planner module 225 may generate a plan including connection information (e.g., ontology) between the plurality of actions and the plurality of concepts. The planner module 225 may generate the plan using information stored in the capsule DB 230 which stores a set of relationships between concepts and actions.

The NLG module 227 may change designated information into a text form. The information changed to the text form may be in the form of a natural language utterance. The TTS module 229 may change information in a text form into information in a speech form.

According to an embodiment, some or all of the functions of the natural language platform 220 may be implemented in the electronic device 201 as well.

The capsule DB 230 may store information on the relationship between the plurality of concepts and actions corresponding to the plurality of domains. A capsule according to an embodiment may include a plurality of action objects (or action information) and concept objects (or concept information) included in the plan. According to an embodiment, the capsule DB 230 may store a plurality of capsules in the form of a concept action network (CAN). According to an embodiment, the plurality of capsules may be stored in a function registry included in the capsule DB 230.

The capsule DB 230 may include a strategy registry that stores strategy information necessary for determining a plan corresponding to a voice input. The strategy information may include reference information for determining one plan when there are a plurality of plans corresponding to the user input. According to an embodiment, the capsule DB 230 may include a follow-up registry that stores information on follow-up actions for suggesting a follow-up action to the user in a designated situation. The follow-up action may include, for example, a follow-up utterance. According to an embodiment, the capsule DB 230 may include a layout registry that stores layout information that is information output through the electronic device 201. According to an embodiment, the capsule DB 230 may include a vocabulary registry that stores vocabulary information included in capsule information. According to an embodiment, the capsule DB 230 may include a dialog registry that stores information on a dialog (or an interaction) with the user. The capsule DB 230 may update the stored objects through a developer tool. The developer tool may include, for example, a function editor for updating an action object or a concept object. The developer tool may include a vocabulary editor for updating the vocabulary. The developer tool may include a strategy editor for generating and registering a strategy for determining a plan. The developer tool may include a dialog editor for generating a dialog with the user. The developer tool may include a follow-up editor for activating a follow-up objective and editing a follow-up utterance that provides a hint. The follow-up objective may be determined based on a current set objective, a preference of the user, or an environmental condition. In an embodiment, the capsule DB 230 may be implemented in the electronic device 201 as well.

The execution engine 240 may obtain a result using the generated plan. The end user interface 250 may transmit the obtained result to the electronic device 201. Accordingly, the electronic device 201 may receive the result and provide the received result to the user. The management platform 260 may manage information used by the intelligent server 200. The big data platform 270 may collect data of the user. The analytic platform 280 may manage a quality of service (QoS) of the intelligent server 200. For example, the analytic platform 280 may manage the components and processing rate (or efficiency) of the intelligent server 200.

The service server 300 may provide a designated service (e.g., food order or hotel reservation) to the electronic device 201. According to an embodiment, the service server 300 may be a server operated by a third party. The service server 300 may provide information to be used for generating a plan corresponding to the received user input to the intelligent server 200. The provided information may be stored in the capsule DB 230. In addition, the service server 300 may provide result information according to the plan to the intelligent server 200.

In the integrated intelligence system 20 described above, the electronic device 201 may provide various intelligent services to the user in response to a user input. The user input may include, for example, an input through a physical button, a touch input, or a voice input.

In an embodiment, the electronic device 201 may provide a speech recognition service through an intelligent app (or a speech recognition app) stored therein. In this case, for example, the electronic device 201 may recognize a user utterance or a voice input received through the microphone, and provide a service corresponding to the recognized voice input to the user.

In an embodiment, the electronic device 201 may perform a designated action alone or together with the intelligent server and/or a service server, based on the received voice input. For example, the electronic device 201 may execute an app corresponding to the received voice input and perform a designated action through the executed app.

In an embodiment, when the electronic device 201 provides a service together with the intelligent server 200 and/or the service server 300, the electronic device 201 may detect a user utterance using the microphone 206 and generate a signal (or voice data) corresponding to the detected user utterance. The electronic device 201 may transmit the voice data to the intelligent server 200 using the communication interface 202.

The intelligent server 200 may generate, as a response to the voice input received from the electronic device 201, a plan for performing a task corresponding to the voice input or a result of performing an action according to the plan. The plan may include, for example, a plurality of actions for performing a task corresponding to a voice input of a user, and a plurality of concepts related to the plurality of actions. The concepts may define parameters input to the execution of the plurality of actions or result values output by the execution of the plurality of actions. The plan may include connection information between the plurality of actions and the plurality of concepts.

The electronic device 201 may receive the response using the communication interface 202. The electronic device 201 may output a voice signal internally generated by the electronic device 201 to the outside using the speaker 205, or output an image internally generated by the electronic device 201 to the outside using the display module 204.

Figure 3:
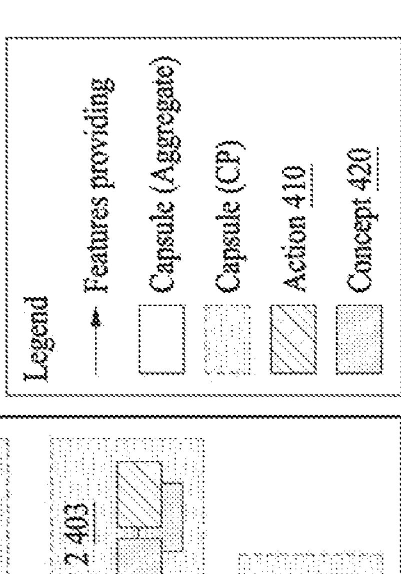
FIG. 3 is a diagram illustrating a form in which relationship information between concepts and actions is stored in a database according to an embodiment.
Figure 3:
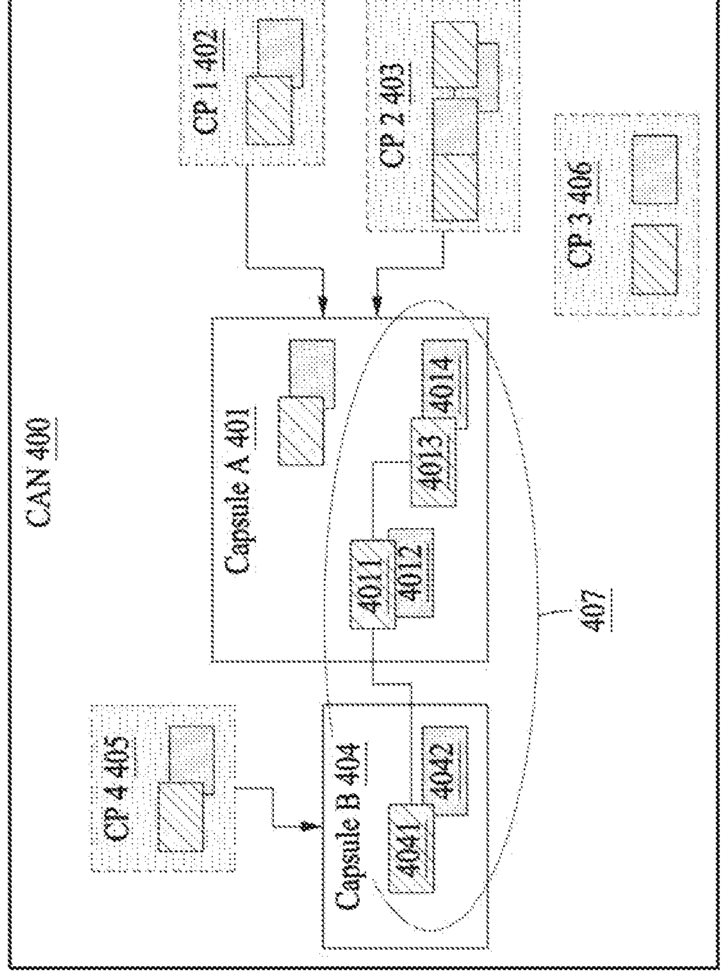

FIG. 3 is a diagram illustrating a form in which relationship information between concepts and actions is stored in a DB according to an embodiment.

A capsule DB (e.g., the capsule DB 230 of FIG. 2) of the intelligent server (e.g., the intelligent server 200 of FIG. 2) may store capsules in the form of a CAN 400. The capsule DB may store an action for processing a task corresponding to a voice input of a user and a parameter required for the action in the form of a CAN.

The capsule DB may store a plurality of capsules (a capsule A 401 and a capsule B 404) respectively corresponding to a plurality of domains (e.g., applications). According to an embodiment, one capsule (e.g., the capsule A 401) may correspond to one domain (e.g., a location (geo) or an application). Further, the one capsule may correspond to at least one service provider (e.g., CP 1 402 or CP 2 403) for performing a function for a domain related to the capsule. According to an embodiment, one capsule may include at least one action 410 for performing a designated function and at least one concept 420.

A natural language platform (e.g., the natural language platform 220 of FIG. 2) may generate a plan for performing a task corresponding to the received speech input using the capsules stored in the capsule DB. For example, a planner module (e.g., the planner module 225 of FIG. 2) of the natural language platform may generate the plan using the capsules stored in the capsule DB. For example, a plan 470 may be generated using actions 4011 and 4013 and concepts 4012 and 4014 of the capsule A 401 and an action 4041 and a concept 4042 of the capsule B 404.

Figure 4:
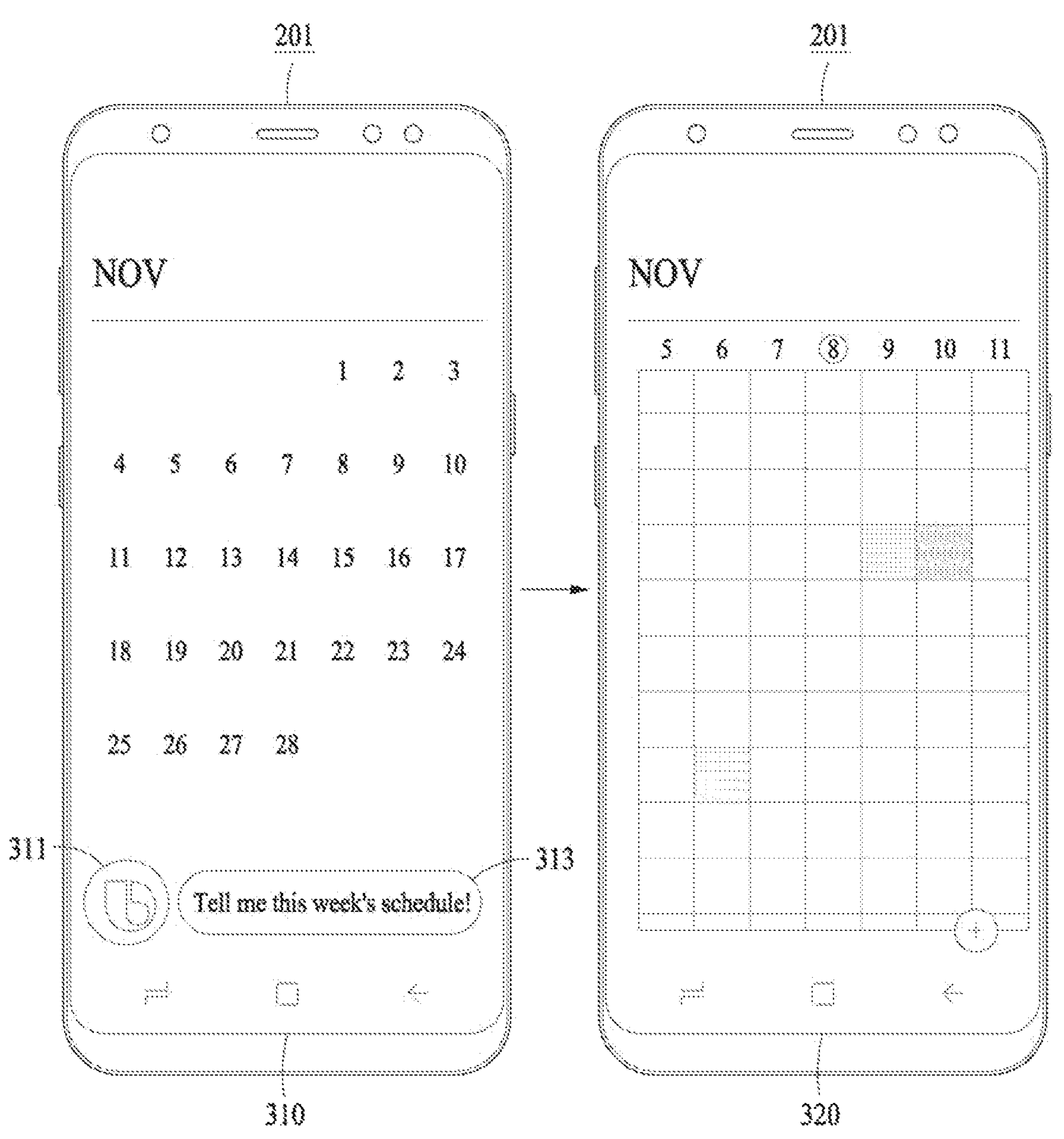
FIG. 4 is a diagram illustrating a screen of an electronic device processing a received voice input through an intelligent app according to an embodiment.

FIG. 4 is a diagram illustrating a screen of an electronic device processing a received voice input through an intelligent app according to an embodiment.

An electronic device 201 may execute an intelligent app to process a user input through an intelligent server (e.g., the intelligent server 200 of FIG. 2).

According to an embodiment, on a screen 310, when a designated voice input (e.g., Wake up!) is recognized or an input through a hardware key (e.g., a dedicated hardware key) is received, the electronic device 201 may execute an intelligent app for processing the voice input. The electronic device 201 may execute the intelligent app, for example, in a state in which a scheduling app is executed. According to an embodiment, the electronic device 201 may display an object (e.g., an icon) 311 corresponding to the intelligent app on the display module 204 (e.g., the display module 160 of FIG. 1 and the display module 204 of FIG. 2). According to an embodiment, the electronic device 201 may receive a voice input by a user utterance. For example, the electronic device 201 may receive a voice input of "Tell me this week's schedule!". According to an embodiment, the electronic device 201 may display a user interface (UI) 313 (e.g., an input window) of the intelligent app in which text data of the received voice input is displayed on the display module 204.

According to an embodiment, on a screen 320, the electronic device 201 may display a result corresponding to the received voice input on the display module 204. For example, the electronic device 201 may receive a plan corresponding to the received user input, and display "this week's schedule" on the display module 204 according to the plan.

Figure 5:
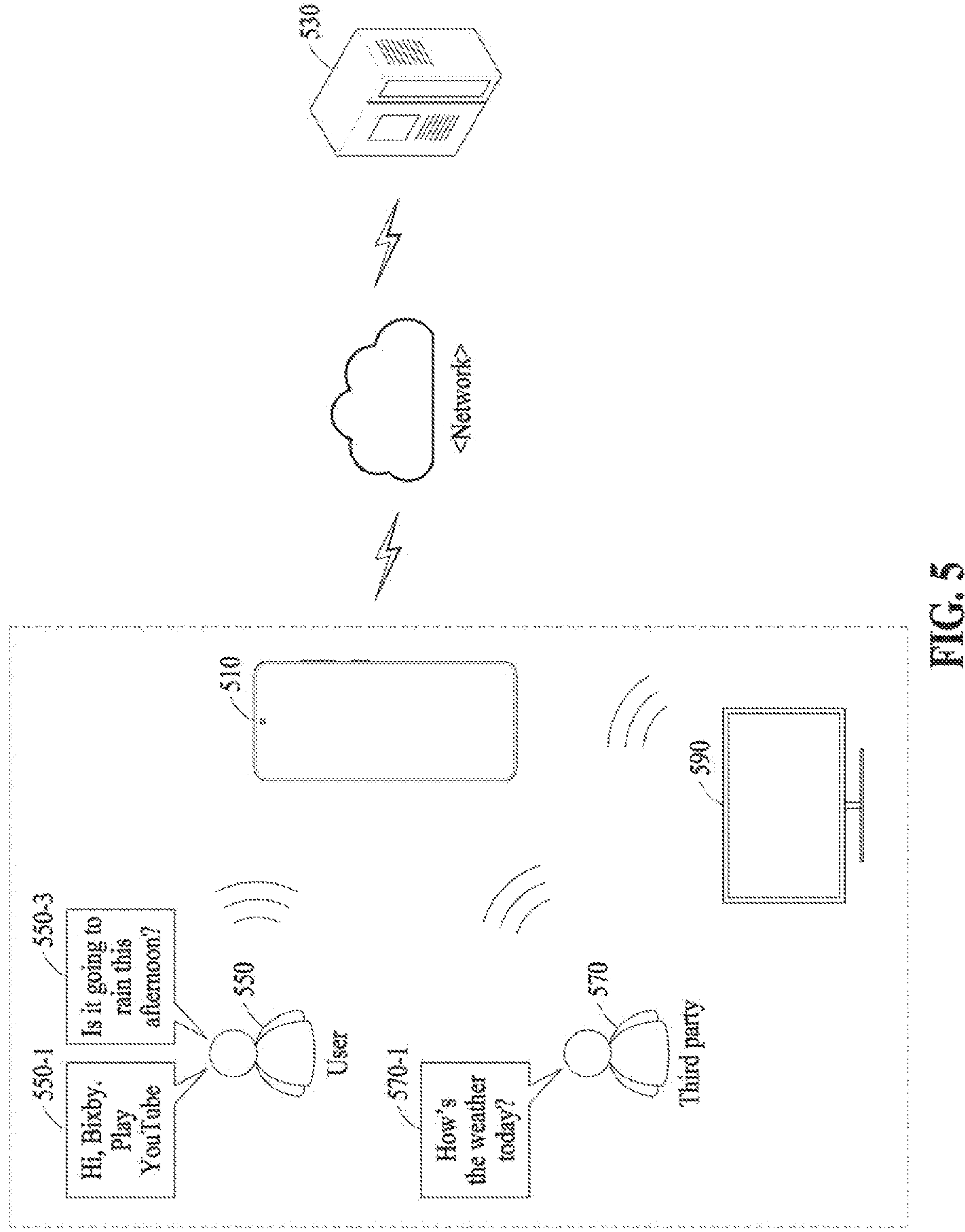
FIG. 5 is a diagram illustrating an example of a situation of speech recognition of an electronic device according to an embodiment.
Figure 6A:
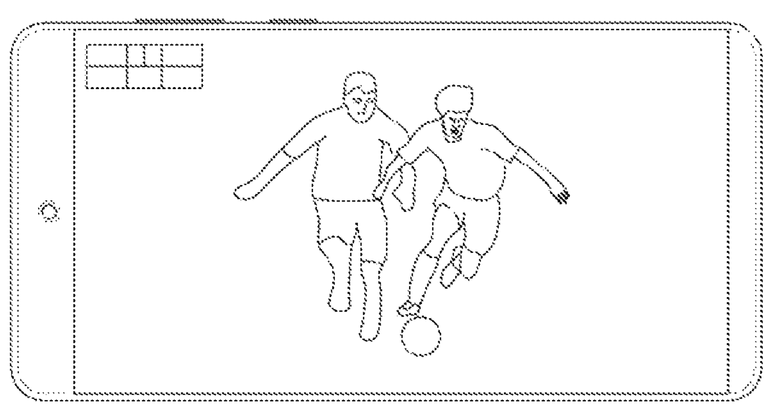
FIGS. 6A and 6B are diagrams illustrating an example of a speech recognition error of an electronic device.
Figure 6A:
Figure 6A:
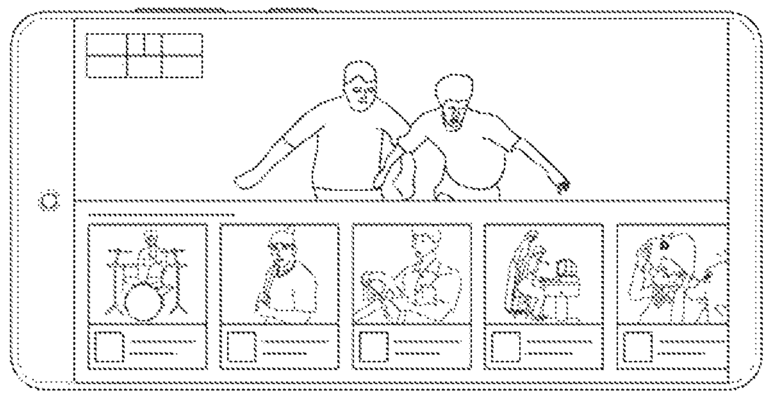
Figure 6B:
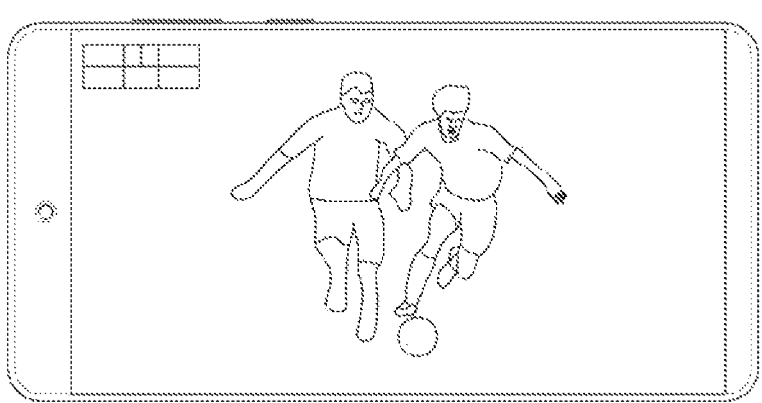
Figure 6B:
Figure 6B:
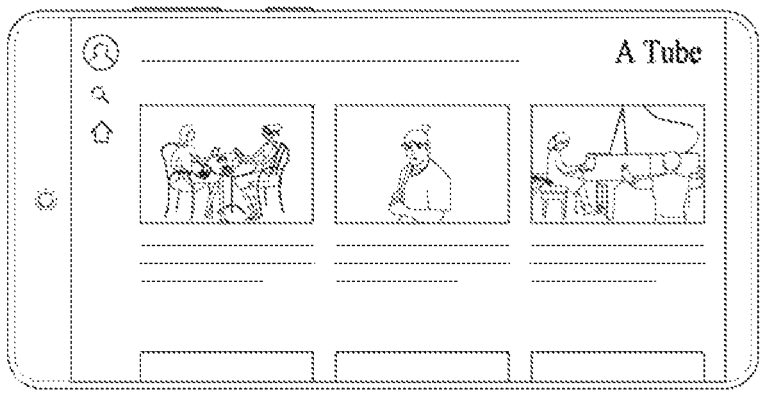

FIG. 5 is a diagram illustrating an example of a situation of speech recognition of an electronic device according to an embodiment, and FIGS. 6A and 6B are diagrams illustrating an example of a speech recognition error of an electronic device.

Referring to FIG. 5, according to an embodiment, an electronic device 510 (e.g., the electronic device 101 of FIG. 1 or the electronic device 201 of FIG. 2) and a server 530 may be connected via a LAN, a WAN, a value added network (VAN), a mobile radio communication network, a satellite communication network, or a combination thereof. The electronic device 510 and the server 530 may communicate with each other through a wired communication method or a wireless communication method (e.g., a wireless LAN (Wi-Fi), Bluetooth, Bluetooth low energy, ZigBee, Wi-Fi direct (WFD), ultra wide band (UWB), infrared data association (IrDA), and near field communication (NFC)).

According to an embodiment, the electronic device 510 may be implemented as at least one of smartphones, tablet personal computers (PCs), mobile phones, speakers (e.g., artificial intelligence (AI) speakers), video phones, e-book readers, desktop PCs, laptop PCs, netbook computers, workstations, servers, personal digital assistants (PDAs), portable multimedia players (PMPs), MP3 players, mobile medical devices, cameras, or a wearable devices.

According to an embodiment, the server 530 may be implemented as software. A portion and/or entire portion of the server 530 may be implemented in the electronic device 510 and/or an intelligent server (e.g., the intelligent server 200 of FIG. 2).

According to an embodiment, the electronic device 510 may activate a speech recognition service (e.g., a speech recognition application) in response to an utterance of a wake-up word (e.g., "Hi, Bixby") of a user 550 and/or manipulation of a speech recognition button (e.g., a Bixby button) of the user 550. The electronic device 510 may recognize a voice of the user 550 through the speech recognition service. The electronic device 510 may recognize a voice (e.g., an intended voice 550-1) of the user 550 and perform an operation (e.g., information search or device control) corresponding to the voice 550-1 to provide convenience to the user 550.

According to an embodiment, the electronic device 510 may recognize a voice of the user 550 (e.g., an unintended voice 550-3 of the user). For example, the electronic device 510 may recognize the unintended voice 550-3 of the user (e.g., "Is it going to rain this afternoon?") uttered after the intended voice 550-1 of the user (e.g., "Play YouTube"). Alternatively, the electronic device 510 may recognize a voice 570-1 (e.g., "How's the weather today?") of a third party 570 and a sound output from another electronic device 590 (e.g., a TV or radio). When the electronic device 510 recognizes a voice other than the intended voice 550-1 of the user (e.g., the unintended voice 550-3 of the user), the voice 570-1 of the third party, and/or a sound (e.g., a sound output from the other electronic device 590), the electronic device 510 may perform an operation not intended by the user 550, which may degrade usability of the speech recognition service.

Referring to FIGS. 6A and 6B, the electronic device 600 may recognize an unintended voice of a user (e.g., the voice 550-3 of FIG. 5), a voice of a third party (e.g., the voice 570-1 of FIG. 5), and/or a sound (e.g., the sound of the other electronic device 590) while a TV program is being broadcast, and provide a voice recognition result. For example, while sports (or sports replay) is being streamed, the electronic device 600 may recognize a sound (e.g., "Thursday, the 28th, all over the country, it will be generally sunny and gradually in the afternoon") of the other electronic device 590 and display a search screen (e.g., a list of contents with high relevance) corresponding to the voice of the other electronic device 590. In another example, while YouTube is playing, the electronic device 510 may recognize the unintended voice 550-3 of the user and activate a search service corresponding to the voice 550-3. When the search service is activated, the electronic device 600 may output a search result screen on the entire screen of the electronic device 600 instead of a content screen being reproduced. A user (e.g., the user 550 of FIG. 5) may experience inconvenience due to the above operation of the electronic device 600 (e.g., the operation not intended by the user). The electronic device 510 (e.g., an electronic device 720 of FIG. 7, an electronic device 800 of FIG. 8, or an electronic device 1300 of FIG. 13B may prevent a malfunction of the electronic device 510 through analysis of a speech recognition error, which may increase the usability of the speech recognition service.

Figure 7:
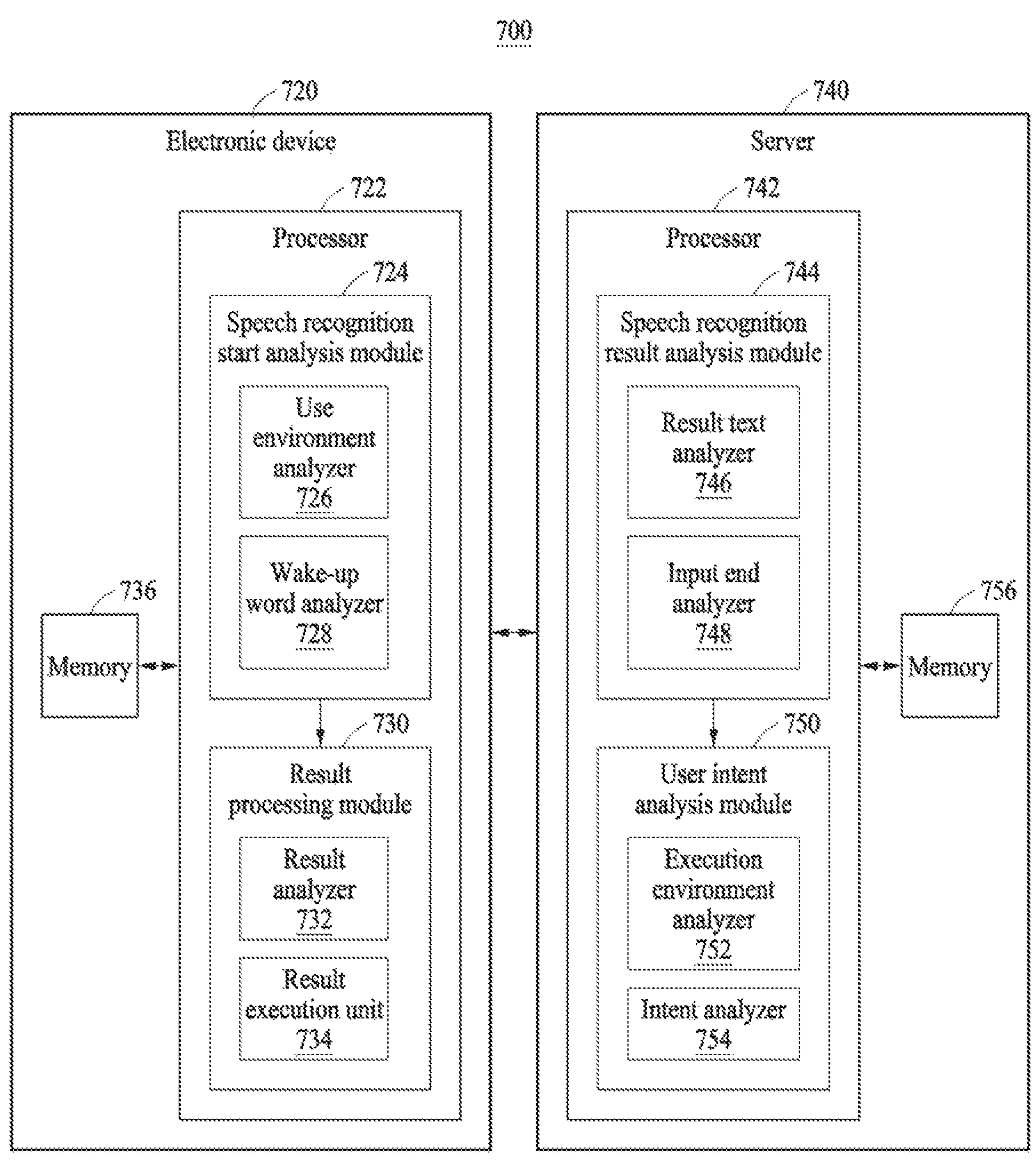
FIG. 7 is a schematic block diagram illustrating a speech recognition system according to an embodiment.

FIG. 7 is a schematic block diagram illustrating a speech recognition system according to an embodiment.

Referring to FIG. 7, according to an embodiment, a speech recognition system 700 may include the electronic device 720 (e.g., the electronic device 101 of FIG. 1, the electronic device 201 of FIG. 2, or the electronic device 510 of FIG. 5), and a server 740 (e.g., the intelligent server 200 of FIG. 2 or the server 530 of FIG. 5). The electronic device 720 may be connected to the server 740 via a LAN, a WAN, a VAN, a mobile radio communication network, a satellite communication network, or a combination thereof.

According to an embodiment, the electronic device 720 may include a processor 722 (e.g., the processor 120 of FIG. 1 or the processor 203 of FIG. 2) and a memory 736 (e.g., the memory 130 of FIG. 1 or the memory 207 of FIG. 2).

According to an embodiment, the processor 722 may execute a speech recognition start analysis module 724 and a result processing module 730. The speech recognition start analysis module 724 and the result processing module 730 may be configured as at least one of a program code including instructions that may be stored in the memory 736, an application, an algorithm, a routine, a set of instructions, or an AI learning model.

According to an embodiment, the speech recognition start analysis module 724 may include a use environment analyzer 726 and a wake-up word analyzer 728. The use environment analyzer 726 may quantify the possibility of a speech recognition error (e.g., the possibility of a speech recognition error due to a noise) by analyzing voice signals (e.g., voice signals converted from the voices 550-1 and 550-3 of the user, the voice 570-1 of the third party, and the sound of the other electronic device 590 of FIG. 5). The use environment analyzer 726 may analyze a use environment (e.g., a use environment of the speech recognition service) by analyzing a signal (e.g., a voice signal) input through a microphone (e.g., the input module 150 of FIG. 1 or the microphone 206 of FIG. 2). In addition, the use environment analyzer 726 may analyze the use environment by using information input by a camera (e.g., the camera module 180 of FIG. 1) and other sensors (e.g., the sensor module 176 of FIG. 1). For example, the use environment analyzer 726 may analyze the presence of an utterer (e.g., the third party 570 of FIG. 5) other than the user or the other electronic device 590, a level of a default noise, and a level of resonance in a space for the utterance. The wake-up word analyzer 728 may quantify reliability of an output result (e.g., speech recognition service activation) of a wake-up word recognizer (e.g., a wake-up module (e.g., a wake-up module 910 of FIG. 9) that responds to a wake-up word). For example, the wake-up word analyzer 728 may analyze whether a voice signal includes a wake-up word and may quantify the reliability. However, when the speech recognition service is activated by the manipulation of a speech recognition button, the operation performed by the wake-up word analyzer 728 may be omitted.

According to an embodiment, the result processing module 730 may include a result analyzer 732 and a result execution unit 734. The result analyzer 732 may finally determine the possibility of a speech recognition error based on a sum (e.g., weighted sum) of analysis scores (e.g., error analysis scores) of modules 724, 730, 744, and 750, and output a speech recognition result. The result execution unit 734 may output (e.g., display on a display of the electronic device) a text (e.g., a text corresponding to the voice) generated by an ASR module (e.g., the ASR module 221 of FIG. 2). In addition, the result execution unit 734 may provide a user (e.g., the user 550 of FIG. 5) with a speech recognition result (e.g., execution of an operation corresponding to a text, reconfirmation of whether to execute an operation, termination of the speech recognition service, or output of a reason for a speech recognition error) in response to the output (e.g., a processing result) of the result analyzer 732.

According to an example, the server 740 may include a processor 742 and a memory 756. The processor 742 may execute a speech recognition result analysis module 744 and a user intent analysis module 750. The speech recognition result analysis module 744 and the user intent analysis module 750 may be configured as at least one of a program code including instructions that may be stored in the memory 756, an application, an algorithm, a routine, a set of instructions, or an AI learning model.

According to an embodiment, the speech recognition result analysis module 744 may include a result text analyzer 746 and an input end analyzer 748. The result text analyzer 746 may quantify a length of a text generated by the ASR module 221. The result text analyzer 746 may quantify (e.g., an error analysis score) the possibility of the speech recognition error based on text-related information (e.g., a length, morpheme, or word structure of a text). The input end analyzer 748 may confirm whether a voice signal is input within an input time limit (e.g., a time limit set in the speech recognition system), or confirm whether a voice input ends by an end point detector (e.g., a voice signal-based end point detector). The input end analyzer 748 may output a result of analyzing a speech recognition error (e.g., an error analysis score) based on the end type of the voice input. For example, the input end analyzer 748 may assign a weight to an error analysis score based on the end type of the voice input.

According to an embodiment, the user intent analysis module 750 may include an execution environment analyzer 752 and an intent analyzer 754. The execution environment analyzer 752 may output an error analysis result based on the type of a currently running service (e.g., Bixby or YouTube) and a state of the electronic device 720 (e.g., a state of power of the electronic device when the speech recognition starts and volume information of the electronic device). The intent analyzer 754 may analyze the intent of a user (e.g., the user 550 of FIG. 5) based on whether a text (e.g., a text converted from the voice signal by the ASR module 221) includes a verb (e.g., a verb for executing a particular operation), the name of a service (e.g., Bixby), the name of an application (e.g., YouTube), and device control information, and may output an error analysis result.

Figure 8:
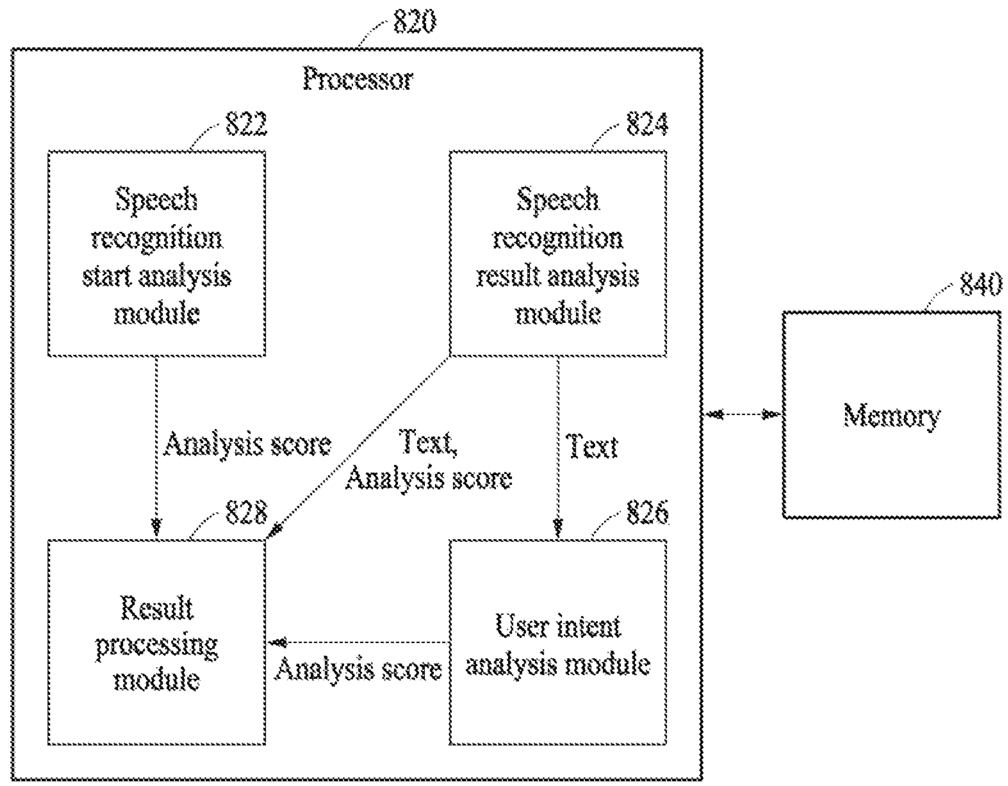
FIG. 8 is a schematic block diagram illustrating an electronic device providing a speech recognition service according to an embodiment.

FIG. 8 is a schematic block diagram illustrating an electronic device providing a speech recognition service according to an embodiment.

Referring to FIG. 8, according to an embodiment, the electronic device 800 (e.g., the electronic device 101 of FIG. 1, the electronic device 201 of FIG. 2, or the electronic device 510 of FIG. 5) may include a processor 820 (e.g., the processor 120 of FIG. 1 or the processor 203 of FIG. 2) and a memory 840 (e.g., the memory 130 of FIG. 1 or the memory 207 of FIG. 2).

According to an embodiment, the processor 820 may execute a speech recognition start analysis module 822, a speech recognition result analysis module 824, a user intent analysis module 826, and a result processing module 828. The speech recognition start analysis module 822, the speech recognition result analysis module 824, the user intent analysis module 826, and the result processing module 828 may be configured as at least one of a program code including instructions that may be stored in the memory 840, an application, an algorithm, a routine, a set of instructions, or an AI learning model. The speech recognition start analysis module 822, the speech recognition result analysis module 824, the user intent analysis module 826, and the result processing module 828 may be substantially the same as the speech recognition start analysis module 724, the speech recognition result analysis module 744, the user intent analysis module 750, and the result processing module 730 of FIG. 7, respectively. However, the electronic device 800 may directly execute the speech recognition result analysis module 744 and the user intent analysis module 750 executed by the processor 742 of the server of FIG. 7. Accordingly, a repeated description thereof is omitted.

Figure 9:
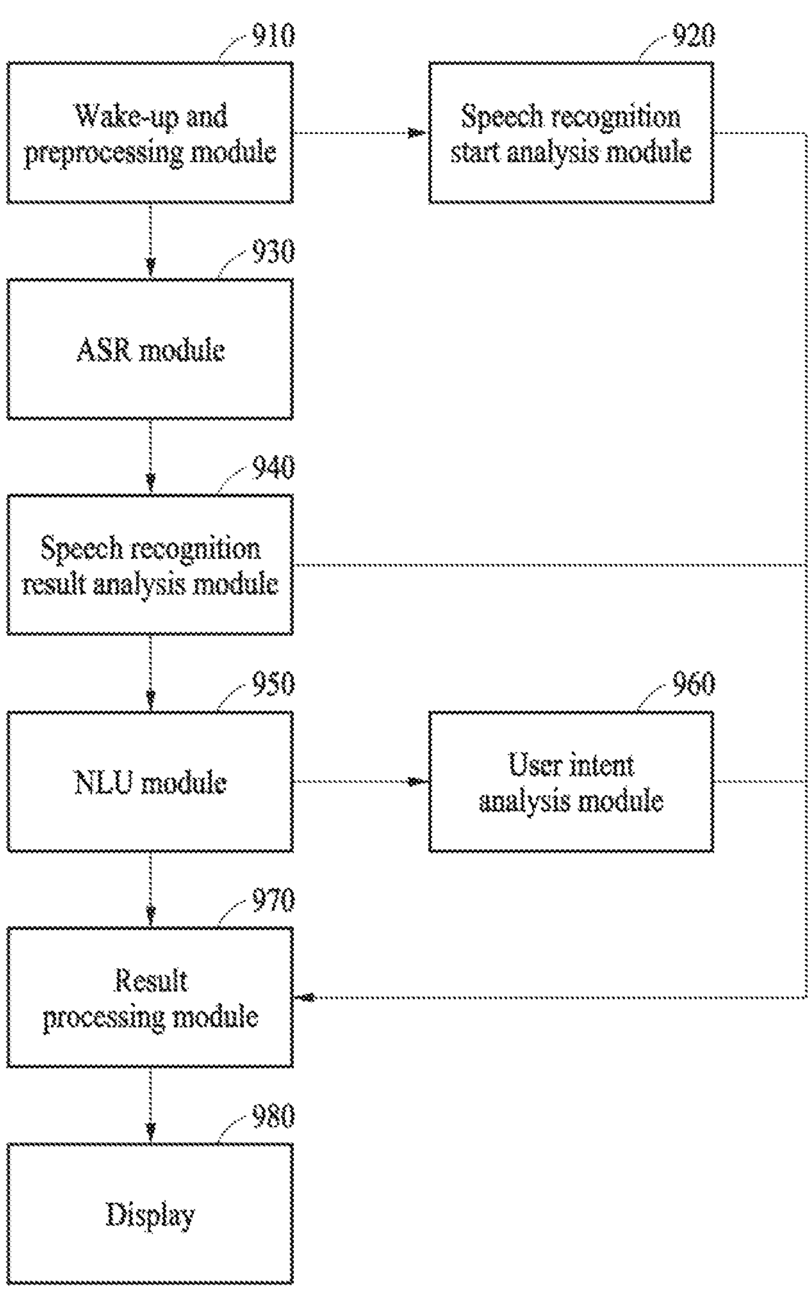
FIG. 9 is a diagram illustrating positions of speech recognition modules in a speech recognition system according to an embodiment.

FIG. 9 is a diagram illustrating positions of speech recognition modules in a speech recognition system according to an embodiment.

Referring to FIG. 9, according to an embodiment, a speech recognition system (e.g., the speech recognition system 700 of FIG. 7) may include a wake-up and preprocessing module 910, a speech recognition start analysis module 920, an ASR module 930, a speech recognition result analysis module 940, an NLU module 950, a user intent analysis module 960, a result processing module 970, and a display 980. The modules 910 to 970 may be executed by the processors (e.g., the processor 120 of FIG. 1, the processor 203 of FIG. 2, the processors 722 and 742 of FIG. 7, or the processor 820 of FIG. 8). The modules 910 to 970 may be configured as at least one of a program code including instructions that may be stored in a memory (e.g., the memory 130 of FIG. 1, the memory 207 of FIG. 2, the memories 736 and 756 of FIG. 7, or the memory 840 of FIG. 8), an application, an algorithm, a routine, a set of instructions, or an AI learning model.

According to an embodiment, the wake-up word and preprocessing module 910 may activate a speech recognition service in response to an utterance of a wake-up word of a user (e.g., the user 550 of FIG. 5) or manipulation of a speech recognition button of the user 550. In addition, the wake-up and preprocessing module 910 may preprocess a voice signal (e.g., remove a noise of a voice signal). The ASR module 930 and the NLU module 950 may be substantially the same as the ASR module 221 and the NLU module 950 described above with reference to FIG. 2, respectively. The speech recognition start analysis module 920, the speech recognition result analysis module 940, the user intent analysis module 960, and the result processing module 970 may be substantially the same as the speech recognition start analysis modules 724 and 822, the speech recognition result analysis modules 744 and 824, the user intent analysis modules 750 and 826, and the result processing modules 730 and 828 described above with reference to FIGS. 7 and 8, respectively. Accordingly, a repeated description thereof is omitted. In an embodiment, the display 980 (in FIG. 9) may output (or provide) a recognition result of the voice. In an embodiment, an electronic device (e.g., a speaker) capable of outputting a recognition result of a voice may be included.

Figure 10:
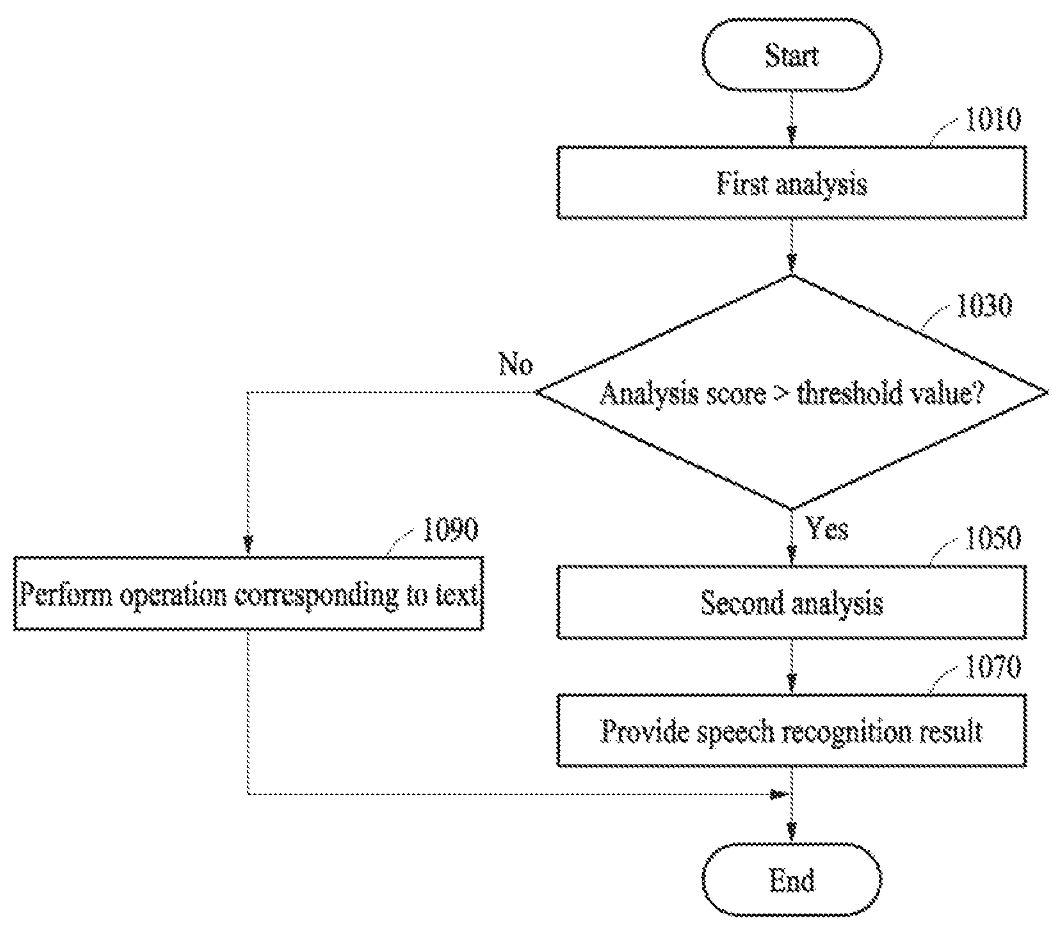
FIG. 10 is a flowchart illustrating a speech recognition method of an electronic device according to an embodiment.

FIG. 10 is a flowchart illustrating a speech recognition method of an electronic device according to an embodiment.

Referring to FIG. 10, according to an embodiment, an electronic device (e.g., the electronic device 101 of FIG. 1, the electronic device 201 of FIG. 2, the electronic device 510 of FIG. 5, the electronic device 720 of FIG. 7, and the electronic device 800 of FIG. 8) may recognize a voice of a user (e.g., the user 550 of FIG. 5) and provide a speech recognition result to the user 550. The electronic device 101, 201, 510, 720, or 800 may improve the accuracy of the speech recognition service by analyzing the speech recognition error. Operations 1010 to 1070 may be sequentially performed, but embodiments are not limited thereto. For example, the order of operations 1010 to 1070 may be changed, and at least two of operations 1010 to 1070 may be performed in parallel. According to an embodiment, it is understood that operations 1010 to 1090 are performed by a processor (e.g., the processor 120 of FIG. 1, the processor 203 of FIG. 2, the processor 722 of FIG. 7, or the processor 820 of FIG. 8) of the electronic device 101, 201, 510, 720, or 800 or a processor (e.g., the processor 742 of FIG. 7) of a server. Operations 1010 to 1070 may be performed by not only the electronic device 101, 201, 510, 720, or 800, but also by a server (e.g., the intelligent server 200 of FIG. 2, the server 530 of FIG. 5, or the server 740 of FIG. 7). Also, as described above with reference to FIG. 7, some operations may be performed by the electronic device 101, 201, 510, 720, or 800 and some of other operations may be performed by the server 200, 530, or 740.

In operation 1010, the electronic device 101, 201, 510, 720, or 800 may perform analysis of a speech recognition error (e.g., a first analysis operation). The electronic device 101, 201, 510, 720, or 800 may convert a voice signal into a text and quantify a length of the text. The electronic device 101, 201, 510, 720, or 800 may output (or obtain) a result of analyzing the speech recognition error (e.g., a first analysis score) by quantifying a degree of the error of the voice signal using information (e.g., a length, morpheme, or word structure of the text). When the length of the text exceeds (or is greater than or equal to) a threshold value (e.g., a threshold length), the result of analyzing the speech recognition error may be proportional to a difference between the length of the text and the threshold value. In addition, the electronic device 101, 201, 510, 720, or 800 may confirm whether a voice signal is input within an input time limit, or confirm whether a voice input ends by an end point detector (e.g., a voice signal-based end point detector). The electronic device 101, 201, 510, 720, or 800 may output the result of analyzing the speech recognition error based on the end type of the voice input. For example, the electronic device 101, 201, 510, 720, or 800 may assign a weight to an error analysis score (e.g., the first analysis score) based on the end type of the voice input.

In operation 1030, the electronic device 101, 201, 510, 720, or 800 may determine whether to additionally perform the analysis of the speech recognition error (e.g., a second analysis operation) in response to a result (e.g., the first analysis score) of the analysis of the speech recognition error (e.g., the first analysis operation). For example, when the error analysis score (e.g., the first analysis score output in operation 1010) exceeds (or is greater than or equal to) a threshold value (e.g., the first threshold value), the electronic device 101, 201, 510, 720, or 800 may additionally perform the analysis of the speech recognition error (e.g., the second analysis operation).

In operation 1050, the electronic device 101, 201, 510, 720, or 800 may perform the analysis of the speech recognition error (e.g., the second analysis operation). The electronic device 101, 201, 510, 720, or 800 may analyze the intent of the user 550 by confirming whether a text (e.g., a text converted from a voice signal by an ASR module) includes a verb (e.g., a verb for executing a particular operation), the name of a service, the name of an application, and device control information (e.g., control information for the electronic device), and may output a result of analyzing the speech recognition error (e.g., the second analysis score). The electronic device 101, 201, 510, 720, or 800 may also output the result of analyzing the speech recognition error based on the currently running service (or application, for example, Bixby or YouTube) and the state of the electronic device (e.g., the state of power of the electronic device when the speech recognition starts and the volume information of the electronic device). In addition, the electronic device 101, 201, 510, 720, or 800 may quantify the possibility of a voice recognition error (e.g., the possibility of a voice recognition error due to a noise) based on a voice signal (e.g., the noise included in a voice signal) and output a result of analyzing the speech recognition error (e.g., a third analysis score). Furthermore, the electronic device 101, 201, 510, 720, or 800 may output a result of analyzing the error (e.g., a fourth analysis score) based on the analysis scores (e.g., the first analysis score, the second analysis score, and the third analysis score) obtained by the analysis of the speech recognition error (e.g., the first analysis operation and the second analysis operation). For example, the fourth analysis score may include the second analysis score. In another example, the fourth analysis score may include the sum (e.g., the weighted sum) of the first analysis score, the second analysis score, and the third analysis score. This may be expressed by the equation below.

$$\sum_{i=0}\{e_i \times w_i\} \quad \text{[Equation 1]}$$

Equation 1 (shown above) is an example, which is not limited thereto, and may be modified, applied, or expand in various ways.

Here, $e_i$ may denote an analysis score and $w_i$ may denote a weight.

In operation 1070, the electronic device 101, 201, 510, 720, or 800 may provide a recognition result of a voice (e.g., the voice 550-1 of FIG. 5) of a user based on a result of analyzing the speech recognition error (e.g., the second analysis operation). A method of providing a voice recognition result of the electronic device 101, 201, 510, 720, or 800 will be described in detail with reference to FIG. 12.

In operation 1090, the electronic device 101, 201, 510, 720, or 800 may perform an operation (e.g., playing YouTube) corresponding to a text (e.g., "Play YouTube") in response to the result (e.g., the first analysis score) of analyzing the speech recognition error (e.g., the first analysis operation).

Figure 11:
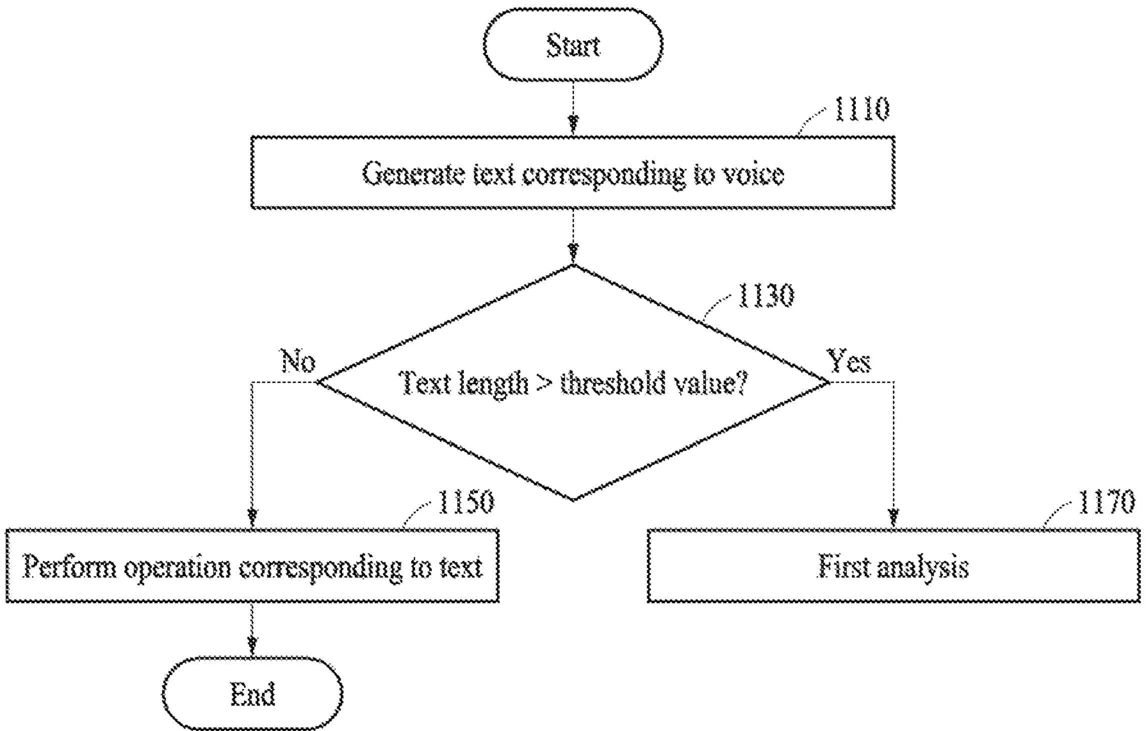
FIG. 11 is a flowchart illustrating a method of analyzing a speech recognition error based on a text length by an electronic device according to an embodiment.

FIG. 11 is a flowchart illustrating a method of analyzing a speech recognition error based on a text length by an electronic device according to an embodiment.

Referring to FIG. 11, according to an embodiment, an electronic device (e.g., the electronic device 101 of FIG. 1, the electronic device 201 of FIG. 2, the electronic device 510 of FIG. 5, the electronic device 720 of FIG. 7, or the electronic device 800 of FIG. 8) may determine whether to perform the analysis of a speech recognition error (e.g., the first analysis operation of FIG. 10) based on a length of a text. Operations 1110 to 1170 may be sequentially performed, but embodiments are not limited thereto. For example, the order of operations 1110 to 1170 may be changed, and at least two of operations 1110 to 1170 may be performed in parallel. According to an embodiment, it is understood that operations 1110 to 1170 are performed by a processor (e.g., the processor 120 of FIG. 1, the processor 203 of FIG. 2, the processor 722 of FIG. 7, or the processor 820 of FIG. 8) of the electronic device 101, 201, 510, 720, or 800 or a processor (e.g., the processor 742 of FIG. 7) of a server. Operations 1110 to 1170 may be performed by not only the electronic device 101, 201, 510, 720, or 800, but also by a server (e.g., the intelligent server 200 of FIG. 2, the server 530 of FIG. 5, or the server 740 of FIG. 7). Also, some operations may be performed by the electronic device 101, 201, 510, 720, or 800 and some of other operations may be performed by the server 200, 530, or 740.

In operation 1110, the electronic device 101, 201, 510, 720, or 800 may generate a text corresponding to a voice. Specifically, the electronic device 101, 201, 510, 720, or 800 may convert a voice signal (e.g., a voice signal converted from the voices 550-1 and 550-3 of the user, the voice 570-1 of the third party, and the sound of the other electronic device 590 of FIG. 5) into a text.

In operation 1130, the electronic device 101, 201, 510, 720, or 800 may compare the text length with a threshold value (e.g., a predetermined threshold value of the text length).

In operation 1150, the electronic device 101, 201, 510, 720, or 800 may perform an operation corresponding to the text based on a comparison result between the text length and the threshold value. For example, when the text length is less than (or less than or equal to) the threshold value, the electronic device 101, 201, 510, 720, or 800 may perform an operation corresponding to the text.

In operation 1170, the electronic device 101, 201, 510, 720, or 800 may perform the analysis of a speech recognition error (e.g., the first analysis operation of FIG. 10) based on the comparison result between the text length and the threshold value. For example, when the text length is greater than or equal to (or exceeds) the threshold value, the electronic device 101, 201, 510, 720, or 800 may perform the first analysis operation.

According to an embodiment, the electronic device 101, 201, 510, 720, or 800 may enhance a speech recognition speed and speech recognition accuracy by additionally performing the analysis of the speech recognition error based on the text length.

Figure 12:
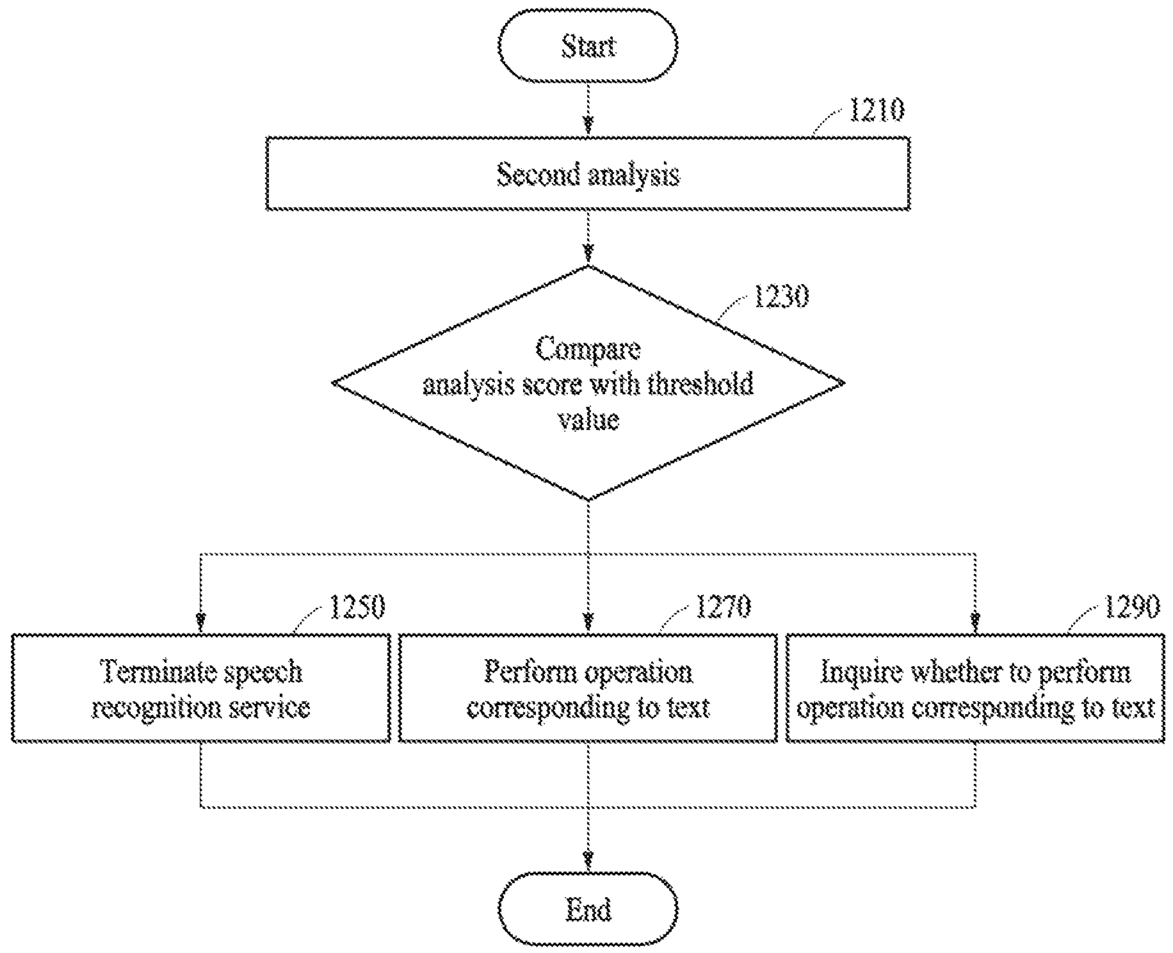
FIG. 12 is a flowchart illustrating a method of providing a speech recognition result based on an error analysis result by an electronic device according to an embodiment.

FIG. 12 is a flowchart illustrating a method of providing a speech recognition result based on an error analysis result by an electronic device according to an embodiment.

Referring to FIG. 12, according to an embodiment, an electronic device (e.g., the electronic device 101 of FIG. 1, the electronic device 201 of FIG. 2, the electronic device 510 of FIG. 5, the electronic device 720 of FIG. 7, or the electronic device 800 of FIG. 8) may provide a speech recognition result to a user (e.g., the user 550 of FIG. 5) based on a result of analyzing a speech recognition error. Operations 1210 to 1290 may be sequentially performed, but embodiments are not limited thereto. For example, the order of operations 1210 to 1290 may be changed, and at least two of operations 1210 to 1290 may be performed in parallel. According to an embodiment, it is understood that operations 1210 to 1290 are performed by a processor (e.g., the processor 120 of FIG. 1, the processor 203 of FIG. 2, the processor 722 of FIG. 7, or the processor 820 of FIG. 8) of the electronic device 101, 201, 510, 720, or 800 or a processor (e.g., the processor 742 of FIG. 7) of a server. Operations 1210 to 1290 may be performed by not only the electronic device 101, 201, 510, 720, or 800, but also by a server (e.g., the intelligent server 200 of FIG. 2, the server 530 of FIG. 5, or the server 740 of FIG. 7). Also, some operations may be performed by the electronic device 101, 201, 510, 720, or 800 and some of other operations may be performed by the server 200, 530, or 740.

In operation 1210, the electronic device 101, 201, 510, 720, or 800 may perform the analysis of a speech recognition error (e.g., the second analysis operation of FIG. 10).

In operation 1230, the electronic device 101, 201, 510, 720, or 800 may compare an analysis score (e.g., the fourth analysis score) with a threshold value (e.g., a second threshold value). For example, the electronic device 101, 201, 510, 720, or 800 may obtain a difference between the analysis score and the threshold value.

In operation 1250, when the analysis score is greater than or equal to (or exceeds) the threshold value and the difference between the analysis score and the threshold value is large (e.g., when the grade of the analysis score is high), the electronic device 101, 201, 510, 720, or 800 may terminate the speech recognition service. For example, the electronic device 101, 201, 510, 720, or 800 may immediately terminate the speech recognition service without any notice. In another example, the electronic device 101, 201, 510, 720, or 800 may output a reason of the speech recognition error (e.g., "The error may occur due to ambient noise. Please try again in a quiet environment") together with the termination of the speech recognition service. A method of outputting a speech recognition error of the electronic device 101, 201, 510, 720, or 800 will be described in detail with reference to FIGS. 13A and 13B.

In operation 1270, when the analysis score is less than (or less than or equal to) the threshold value, the electronic device 101, 201, 510, 720, or 800 may perform an operation corresponding to the text.

In operation 1290, when the analysis score is greater than or equal to (or exceeds) the threshold value and the difference between the analysis score and the threshold value is not relatively large (e.g., the grade of the analysis score is relatively low), the electronic device 101, 201, 510, 720, or 800 may inquire a user (e.g., the user 550 of FIG. 5) whether to perform an operation (e.g., "Do you want to play YouTube?" or "Do you want to search for the weather?") corresponding to a text (e.g., "Play YouTube" or "How's the weather today?"). The electronic device 101, 201, 510, 720, or 800 may perform the operation corresponding to the text or terminate the speech recognition service based on a response of the user 550 to the inquiry.

According to an embodiment, the electronic device 101, 201, 510, 720, or 800 may enhance the accuracy of the speech recognition service by providing the speech recognition result to the user based on the result of analyzing the speech recognition error (e.g., the first to fourth analysis scores).

According to an embodiment, when the error analysis score (e.g., the first to fourth analysis scores) is not relatively high, the electronic device 101, 201, 510, 720, or 800 may inquire the user whether to perform the operation, thereby relatively reducing malfunction (e.g., an operation not intended by the user).

Figures 13A, 13B:
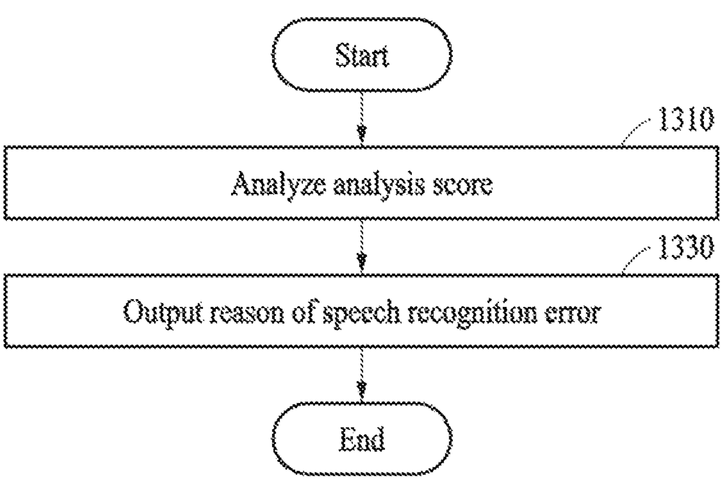
FIG. 13A is a flowchart illustrating a method of outputting a reason of a speech recognition error by an electronic device according to an embodiment.
FIG. 13B is a diagram illustrating an example of a method of outputting a speech recognition error by an electronic device according to an embodiment.

FIG. 13A is a flowchart illustrating a method of outputting a reason of a speech recognition error by an electronic device according to an embodiment, and FIG. 13B is a diagram illustrating an example of a method of outputting a speech recognition error by an electronic device according to an embodiment.

According to an embodiment, it is understood that operations 1310 to 1330 are performed by a processor (e.g., the processor 120 of FIG. 1, the processor 203 of FIG. 2, the processor 722 of FIG. 7, or the processor 820 of FIG. 8) of the electronic device 101, 201, 510, 720, or 800 or a processor (e.g., the processor 742 of FIG. 7) of a server.

Referring to FIG. 13A, according to an embodiment, an electronic device (e.g., the electronic device 101 of FIG. 1, the electronic device 201 of FIG. 2, the electronic device 510 of FIG. 5, the electronic device 720 of FIG. 7, or the electronic device 800 of FIG. 8) may output a reason of the speech recognition error to a user (e.g., the user 550 of FIG. 5) based on an error analysis score (e.g., the first to fourth analysis scores). Operations 1310 and 1320 may be performed by not only the electronic device 101, 201, 510, 720, or 800, but also by a server (e.g., the intelligent server 200 of FIG. 2, the server 530 of FIG. 5, or the server 740 of FIG. 7). Also, some operations may be performed by the electronic device 101, 201, 510, 720, or 800 and some of other operations may be performed by the server 200, 530, or 740.

In operation 1310, the electronic device 101, 201, 510, 720, or 800 may analyze an error analysis score (e.g., the fourth analysis score). For example, the electronic device 101, 201, 510, 720, or 800 may determine the order (e.g., the order of a high level of contribution) of the reasons of the error contributing to the error analysis score (e.g., the voice 550-3 not intended by the user, the voice 570-1 of the third party, the sound of the other electronic device 590, and other ambient noise of FIG. 5).

In operation 1330, the electronic device 101, 201, 510, 720, or 800 may output the reason of the speech recognition error to the user 550.

Referring to FIG. 13B, according to an embodiment, an electronic device 1300 (e.g., the electronic device 101 of FIG. 1, the electronic device 201 of FIG. 2, the electronic device 510 of FIG. 5, the electronic device 720 of FIG. 7, or the electronic device 800 of FIG. 8) may output the reason of the speech recognition error to a display (e.g., the display 980 of FIG. 9). Alternatively, the electronic device 1300 may output the reason of the speech recognition error as a voice guide or may output the reason of the speech recognition error to the display 980 together with a voice guide.

According to an embodiment, the electronic device 1300 may provide the user 550 with appropriate feedback (e.g., the output of the reason of the speech recognition error) in response to the utterance (e.g., the voice 550-1 of FIG. 5) of the user, thereby increasing usability of the speech recognition service.

An electronic device 101, 201, 510, 720, 800, or 1300 includes a memory 130, 207, or 840 including instructions, and a processor 120, 203, or 820 electrically connected or operatively connected to the memory 130, 207, or 840 and configured to execute the instructions. When the instructions are executed by the processor 120, 203, or 820, the processor 120, 203, or 820 is configured to perform a first analysis operation of confirming a recognition error for a voice based on an input time of the voice. When the instructions are executed by the processor 120, 203, or 820, the processor 120, 203, or 820 is configured to determine whether to perform a second analysis operation of confirming the recognition error in response to a result of the first analysis operation. When the instructions are executed by the processor 120, 203, or 820, the processor 120, 203, or 820 is configured to perform the second analysis operation based on a text corresponding to the voice based on a determination to perform the second analysis operation. When the instructions are executed by the processor 120, 203, or 820, the processor 120, 203, or 820 is configured to provide a recognition result of the voice based on a result of the second analysis operation.

The processor 120, 203, or 820 may be configured to determine whether to perform the first analysis operation based on a length of the text.

The processor 120, 203, or 820 may be configured to obtain a first analysis score for the first analysis operation based on detection of an end point of the voice and the length of the text. The processor 120, 203, or 820 may be configured to determine whether to perform the second analysis operation by comparing the first analysis score with a first threshold value.

The processor 120, 203, or 820 may be configured to obtain the first analysis score by adding a detection analysis score based on the detection of the end point of the voice and a text length analysis score based on the length of the text. When the length exceeds a threshold length, the analysis score based on the length may be proportional to a difference between the length and the threshold length.

The processor 120, 203, or 820 may be configured to obtain a second analysis score for the second analysis operation based on whether the text includes a name of an application, a wake-up word, or a verb. The processor 120, 203, or 820 may be configured to provide the recognition result by comparing the second analysis score with a second threshold value.

The processor 120, 203, or 820 may be configured to obtain a third analysis score based on a noise. The processor 120, 203, or 820 may be configured to obtain a fourth analysis score for the second analysis operation based on the first analysis score, the second analysis score, and the third analysis score. The processor 120, 203, or 820 may be configured to provide the recognition result by comparing the fourth analysis score with the second threshold value.

The processor 120, 203, or 820 may be configured to obtain the fourth analysis score by weight-summing the first analysis score, the second analysis score, and the third analysis score.

The processor 120, 203, or 820 may be configured to provide the recognition result based on a difference between the fourth analysis score and the second threshold value.

The processor 120, 203, or 820 may be configured to terminate speech recognition, perform an operation corresponding to the text, or confirm whether to perform the operation based on the difference between the fourth analysis score and the second threshold value.

The processor 120, 203, or 820 may be configured to output a reason of the recognition error based on the fourth analysis score, when the speech recognition is terminated.

A method of operating an electronic device 101, 201, 510, 720, 800, or 1300 includes performing a first analysis operation of confirming a recognition error for a voice based on an input time of the voice. The method includes determining whether to perform a second analysis operation of confirming the recognition error in response to a result of the first analysis operation. The method includes performing the second analysis operation based on a text corresponding to the voice, based on a determination to perform the second analysis operation. The method includes providing a recognition result of the voice based on a result of the second analysis operation.

The method may include determining whether to perform the first analysis operation based on a length of the text.

The performing of the first analysis operation may include obtaining a first analysis score for the first analysis operation based on detection of an end point of the voice and the length of the text. The determining of whether to perform the second analysis operation may include determining whether to perform the second analysis operation by comparing the first analysis score with a first threshold value.

The obtaining of the first analysis operation score may include obtaining the first analysis score by adding a detection analysis score based on the detection of the end point of the voice and a text length analysis score based on the length of the text. When the length exceeds a threshold length, the analysis score based on the length may be proportional to a difference between the length and the threshold length.

The performing of the second analysis operation may include obtaining a second analysis score for the second analysis operation based on whether the text includes a name of an application, a wake-up word, or a verb. The providing may include providing the recognition result by comparing the second analysis score with a second threshold value.

The method may further include obtaining a third analysis score based on a noise. The obtaining of the second analysis score may include obtaining a fourth analysis score for the second analysis operation based on the first analysis score, the second analysis score, and the third analysis score. The providing of the recognition result by comparing the second analysis score with the second threshold value may include providing the recognition result by comparing the fourth analysis score with the second threshold value.

The obtaining of the fourth analysis score may include obtaining the fourth analysis score by weight-summing the first analysis score, the second analysis score, and the third analysis score.

The providing of the recognition result by comparing the fourth analysis score with the second threshold value may include providing the recognition result based on a difference between the fourth analysis score and the second threshold value.

The providing of the recognition result based on the difference between the fourth analysis score and the second threshold value may include terminating speech recognition, performing an operation corresponding to the text, or confirming whether to perform the operation based on the difference between the fourth analysis score and the second threshold value.

The method may further include outputting a reason of the recognition error based on the fourth analysis score, when the speech recognition is terminated.

The electronic device according to an embodiment disclosed herein may be one of various types of electronic devices. The electronic device may include, for example, a portable communication device (e.g., a smartphone), a computer device, a portable multimedia device, a portable medical device, a camera, a wearable device, or a home appliance device. According to an embodiment of the disclosure, the electronic device is not limited to those described above.

It should be understood that an embodiment of the present disclosure and the terms used therein are not intended to limit the technological features set forth herein to particular embodiments and include various changes, equivalents, or replacements for a corresponding embodiment. In connection with the description of the drawings, like reference numerals may be used for similar or related components. It is to be understood that a singular form of a noun corresponding to an item may include one or more of the things, unless the relevant context clearly indicates otherwise. As used herein, “A or B”, “at least one of A and B”, “at least one of A or B”, “A, B or C”, “at least one of A, B and C”, and “at least one of A, B, or C”, each of which may include any one of the items listed together in the corresponding one of the phrases, or all possible combinations thereof. Terms such as “1$^{st}$”, “2$^{nd}$” or “first” or “second” may simply be used to distinguish the component from other components in question, and do not limit the components in other aspects (e.g., importance or order). It is to be understood that if a component (e.g., a first component) is referred to, with or without the term “operatively” or “communicatively”, as “coupled with”, “coupled to”, “connected with”, or “connected to” another component (e.g., a second component), it means that the component may be coupled with the other component directly (e.g., by wire), wirelessly, or via a third component.

As used in connection with an embodiment of the disclosure, the term “module” may include a unit implemented in hardware, software, or firmware, and may interchangeably be used with other terms, for example, “logic”, “logic block”, “part”, or “circuitry”. A module may be a single integral component, or a minimum unit or part thereof, adapted to perform one or more functions. For example, according to an embodiment, the module may be implemented in a form of an application-specific integrated circuit (ASIC).

Embodiments as set forth herein may be implemented as software (e.g., the program 140) including one or more instructions that are stored in a storage medium (e.g., an internal memory 136 or an external memory 138) that is readable by a machine (e.g., the electronic device 101). For example, a processor (e.g., the processor 120) of the machine (e.g., the electronic device 101) may invoke at least one of the one or more instructions stored in the storage medium, and execute it. This allows the machine to be operated to perform at least one function according to the at least one instruction invoked. The one or more instructions may include code generated by a compiler or code executable by an interpreter. The machine-readable storage medium may be provided in the form of a non-transitory storage medium. Here, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method may be included and provided in a computer program product. The computer program product may be traded as a product between a seller and a buyer. The computer program product may be distributed in the form of a machine-readable storage medium (e.g., compact disc read-only memory (CD-ROM)), or be distributed (e.g., downloaded or uploaded) online via an application store (e.g., PlayStore™) or between two user devices (e.g., smartphones) directly. If distributed online, at least part of the computer program product may be temporarily generated or at least temporarily stored in the machine-readable storage medium, such as memory of the manufacturer's server, a server of the application store, or a relay server.

According to an embodiment, each component (e.g., a module or a program) of the above-described components may include a single entity or multiple entities, and some of the multiple entities may be separately disposed in different components. According to an embodiment, one or more of the above-described components or operations may be omitted, or one or more other components or operations may be added. Alternatively or additionally, a plurality of components (e.g., modules or programs) may be integrated into a single component. In such a case, the integrated component may still perform one or more functions of each of the plurality of components in the same or similar manner as they are performed by a corresponding one of the plurality of components before the integration. According to embodiments, operations performed by the module, the program, or another component may be carried out sequentially, in parallel, repeatedly, or heuristically, or one or more of the operations may be executed in a different order or omitted, or one or more other operations may be added.

What is claimed is:

1. An electronic device comprising:

at least one processor including processing circuitry, memory storing instructions that, when executed by the at least one processor individually or collectively, cause the electronic device to:

perform a first analysis operation of confirming a recognition error for a voice;

obtain a first analysis score for the first analysis operation based on a detection of an end point of the voice and a length of a text corresponding to the voice;

determine whether to perform a second analysis operation of confirming the recognition error by comparing the first analysis score with a first threshold value;

based on a determination to perform the second analysis operation, perform the second analysis operation based on the text; and provide a recognition result of the voice based on a result of the second analysis operation.

2. The electronic device of claim 1, wherein the instructions, when executed by the at least one processor individually or collectively, further cause the electronic device to determine whether to perform the first analysis operation based on the length of the text.

3. The electronic device of claim 1, wherein the instructions, when executed by the at least one processor individually or collectively, further cause the electronic device to obtain the first analysis score by adding a detection analysis score based on the detection of the end point of the voice and a text length analysis score based on the length of the text, and wherein, when the length exceeds a threshold length, the first analysis score based on the length of the text is proportional to a difference between the length and the threshold length.

4. The electronic device of claim 1, wherein the instructions, when executed by the at least one processor individually or collectively, further cause the electronic device to:

obtain a second analysis score for the second analysis operation based on whether the text includes a name of an application, a wake-up word, or a verb; and provide the recognition result by comparing the second analysis score with a second threshold value.

5. The electronic device of claim 4, wherein the instructions, when executed by the at least one processor individually or collectively, further cause the electronic device to:

obtain a third analysis score based on a noise;

obtain a fourth analysis score for the second analysis operation based on the first analysis score, the second analysis score, and the third analysis score; and provide the recognition result by comparing the fourth analysis score with the second threshold value.

6. The electronic device of claim 5, wherein the instructions, when executed by the at least one processor individually or collectively, further cause the electronic device to:

obtain the fourth analysis score by weight-summing the first analysis score, the second analysis score, and the third analysis score.

7. The electronic device of claim 5, wherein the instructions, when executed by the at least one processor individually or collectively, further cause the electronic device to provide the recognition result based on a difference between the fourth analysis score and the second threshold value.

8. The electronic device of claim 7, wherein the instructions, when executed by the at least one processor individually or collectively, further cause the electronic device to terminate speech recognition, perform an operation corresponding to the text, or confirm whether to perform the operation based on the difference between the fourth analysis score and the second threshold value.

9. The electronic device of claim 8, wherein the instructions, when executed by the at least one processor individually or collectively, further cause the electronic device to output a reason of the recognition error based on the fourth analysis score, based on the speech recognition being terminated.

10. A method performed by an electronic device, the method comprising:

performing a first analysis operation of confirming a recognition error for a voice;

obtaining a first analysis score for the first analysis operation based on a detection of an end point of the voice and a length of a text corresponding to the voice;

determining whether to perform a second analysis operation of confirming the recognition error by comparing the first analysis score with a first threshold value;

based on determining to perform the second analysis operation, performing the second analysis operation based on the text; and providing a recognition result of the voice based on a result of the second analysis operation.

11. The method of claim 10, further comprising determining whether to perform the first analysis operation based on the length of the text.

12. The method of claim 10, wherein the obtaining of the first analysis score comprises obtaining the first analysis score by adding a detection analysis score based on the detection of the end point of the voice and a text length analysis score based on the length of the text, and wherein, when the length exceeds a threshold length, the first analysis score based on the length of the text is proportional to a difference between the length and the threshold length.

13. The method of claim 10, wherein the performing of the second analysis operation comprises obtaining a second analysis score for the second analysis operation based on whether the text includes a name of an application, a wake-up word, or a verb, and wherein the providing comprises providing the recognition result by comparing the second analysis score with a second threshold value.

14. The method of claim 13, further comprising obtaining a third analysis score based on a noise, wherein the obtaining of the second analysis score comprises obtaining a fourth analysis score for the second analysis operation based on the first analysis score, the second analysis score, and the third analysis score, and wherein the providing of the recognition result by comparing the second analysis score with the second threshold value comprises providing the recognition result by comparing the fourth analysis score with the second threshold value.

15. The method of claim 14, wherein the obtaining of the fourth analysis score comprises obtaining the fourth analysis score by weight-summing the first analysis score, the second analysis score, and the third analysis score.

16. The method of claim 14, wherein the providing of the recognition result by comparing the fourth analysis score with the second threshold value comprises providing the recognition result based on a difference between the fourth analysis score and the second threshold value.

17. The method of claim 16, wherein the providing of the recognition result based on the difference between the fourth analysis score and the second threshold value comprises terminating speech recognition, performing an operation corresponding to the text, or confirming whether to perform the operation based on the difference between the fourth analysis score and the second threshold value.

18. The method of claim 17, further comprising outputting a reason of the recognition error based on the fourth analysis score, based on the speech recognition being terminated.

* * * * *